(12) United States Patent
Sasaki

(10) Patent No.: US 7,668,824 B2
(45) Date of Patent: Feb. 23, 2010

(54) INTERFACE DEVICE, INFERRING SYSTEM, AND VISUAL EXPRESSION METHOD

(75) Inventor: Mikio Sasaki, Kariya (JP)

(73) Assignee: DENSO Corporation, Kariya (JP)

( * ) Notice: Subject to any disclaimer, the term of this patent is extended or adjusted under 35 U.S.C. 154(b) by 408 days.

(21) Appl. No.: 11/068,572

(22) Filed: Feb. 28, 2005

(65) Prior Publication Data

US 2005/0202845 A1 Sep. 15, 2005

(30) Foreign Application Priority Data

Mar. 1, 2004 (JP) ............................. 2004-056579
Mar. 9, 2004 (JP) ............................. 2004-066195

(51) Int. Cl.
*G06F 17/30* (2006.01)

(52) U.S. Cl. .......................................................... 707/6

(58) Field of Classification Search ........................ None
See application file for complete search history.

(56) References Cited

U.S. PATENT DOCUMENTS

| | | | | |
|---|---|---|---|---|
| 4,959,799 A | * | 9/1990 | Yoshiura et al. | 706/48 |
| 5,165,011 A | * | 11/1992 | Hisano | 706/50 |
| 5,197,116 A | * | 3/1993 | Katoh et al. | 706/48 |
| 5,208,898 A | * | 5/1993 | Funabashi et al. | 706/45 |
| 5,247,651 A | * | 9/1993 | Clarisse | 703/13 |
| 5,305,424 A | * | 4/1994 | Ma et al. | 706/52 |
| 5,329,612 A | | 7/1994 | Kakazu et al. | |
| 5,495,558 A | * | 2/1996 | Tashima | 706/52 |
| 6,664,980 B2 | * | 12/2003 | Bryan et al. | 715/738 |
| 6,687,696 B2 | * | 2/2004 | Hofmann et al. | 707/6 |

(Continued)

FOREIGN PATENT DOCUMENTS

JP A-H3-102527 4/1991

(Continued)

OTHER PUBLICATIONS

Jang, J.-S.R., "ANFIS: adaptive-network-based fuzzy inference system," Systems, Man and Cybernetics, IEEE Transactions on, vol. 23, No. 3, pp. 665-685, May/Jun. 1993 URL: http://ieeexplore.ieee.org/iel1/21/6499/00256541.pdf?isnumber=6499⌐=STD&arnumber=256541&arnumber=256541&arSt=665&ared=685&arAuthor=Jang%2C+J.-S.R.*

(Continued)

*Primary Examiner*—Neveen Abel Jalil
*Assistant Examiner*—Mark Andrew X Radtke
(74) *Attorney, Agent, or Firm*—Harness, Dickey & Pierce, PLC

(57) ABSTRACT

When a start key is operated, an inferring process of estimating a demand of a user is executed on the basis of preset situation data, a user profile, and situation data manually input via a situation setting key. Based on the inference result, a genre list and a contents list are reconstructed so that genres and contents items are arranged in order of the degree of a demand of the user. The top three genres extracted from the reconstructed genre list are associated with three selection keys, and the names of the associated genres or labels of the genres are displayed in genre name display parts. It enables the user to easily and instantaneously select one of contents items to be processed.

33 Claims, 21 Drawing Sheets

U.S. PATENT DOCUMENTS

| | | | |
|---|---|---|---|
| 7,137,099 B2 * | 11/2006 | Knight et al. | 717/100 |
| 7,299,270 B2 * | 11/2007 | Kolluri et al. | 709/218 |
| 2002/0065836 A1 | 5/2002 | Sasaki | |
| 2003/0167263 A1 | 9/2003 | Sasaki et al. | |

FOREIGN PATENT DOCUMENTS

| | | |
|---|---|---|
| JP | A-H4-299421 | 10/1992 |
| JP | A-H5-126980 | 5/1993 |
| JP | A-H5-298101 | 11/1993 |
| JP | A-H9-258983 | 10/1997 |
| JP | 11-351901 | 12/1999 |
| JP | 2000-020090 | 1/2000 |
| JP | 2000-112604 | 4/2000 |
| JP | 2001-027944 | 1/2001 |
| JP | 2003-150297 | 5/2003 |
| JP | 2003-256116 | 9/2003 |

OTHER PUBLICATIONS

Yoji Masubuchi et al , "A research and development of Mobile Workflow System for Field Service With Case and Rule Based Reasoning".

Office Action dated Aug. 22, 2008 in Japanese Application No. 2004-256116 with English translation thereof.

Notice of Reason for Rejection mailed Jul. 14, 2009 in a corresponding Japanese application No. 2004-066195 with English translation.

* cited by examiner

FIG. 5

<SITUATION DESCRIPTION A1>

SEASON: SUMMER
WEATHER: RAIN
PURPOSE: OVERSEAS BUSINESS TRIP
DESTINATION: NAGOYA AIRPORT
INFORMATION: TYPHOON IS APPROACHING
USER SITUATION: DRIVING

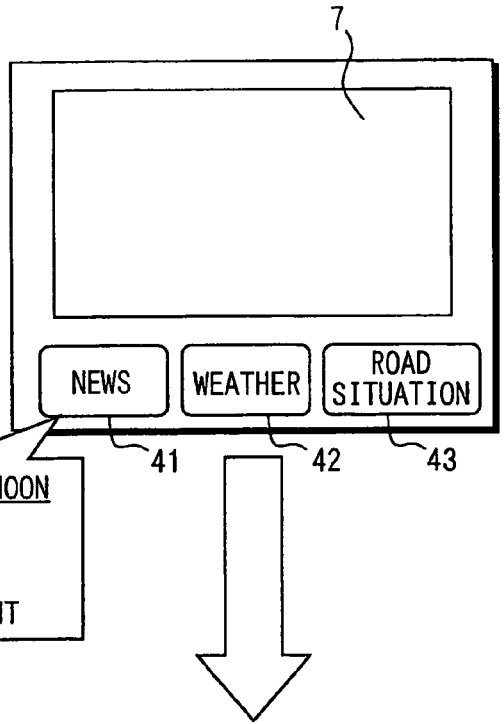

(CONTENTS LIST)
1: NEWS OF TYPHOON
K: POLITICS
N: ENTERTAINMENT

<SITUATION DESCRIPTION A2>

SEASON: SUMMER
WEATHER: RAIN
PURPOSE: OVERSEAS BUSINESS TRIP
DESTINATION: SYDNEY
INFORMATION: TYPHOON IS APPROACHING
USER SITUATION: ARRIVED AT AIRPORT

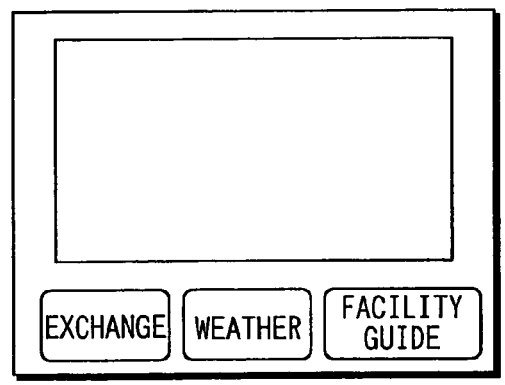

FIG. 6

<SITUATION DESCRIPTION B1>

SEASON: SPRING (CONSECUTIVE HOLIDAYS IN MAY)
WEATHER: CLEAR
PURPOSE: TRIP
DESTINATION: HOTEL IN YOKOHAMA
INFORMATION: WORLD CUP IS BEING HELD
USER SITUATION: DRIVING ON HIGHWAY (CONTENTS LIST)

1: NEWS OF WORLD CUP
　⋮
K: BASEBALL
　⋮
N: GOLF

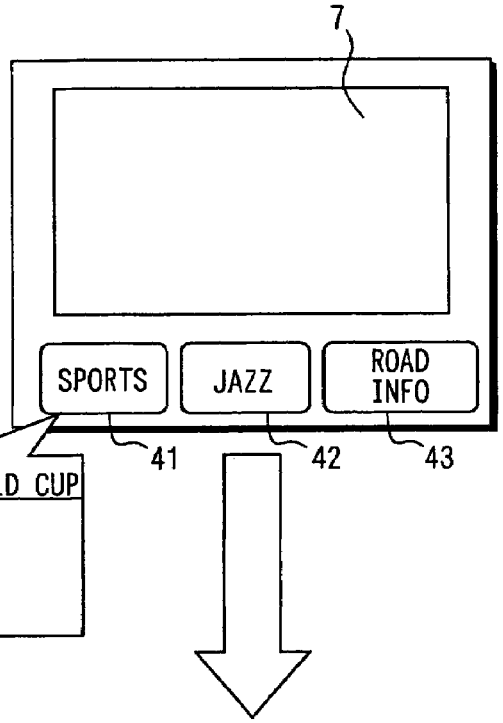

<SITUATION DESCRIPTION B2>

SEASON: SPRING (CONSECUTIVE HOLIDAYS IN MAY)
WEATHER: CLEAR
PURPOSE: TRIP
DESTINATION: HOTEL IN YOKOHAMA
INFORMATION: EVENT IN STADIUM
USER SITUATION: DRIVING WITH FAMILY IN YOKOHAMA CITY

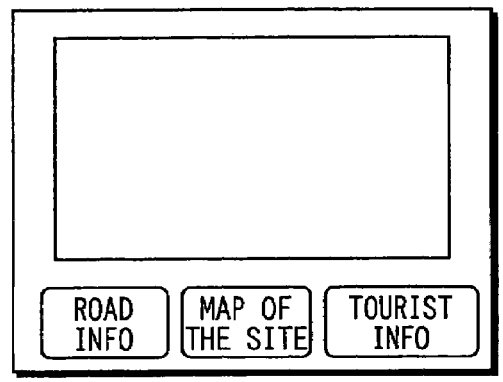

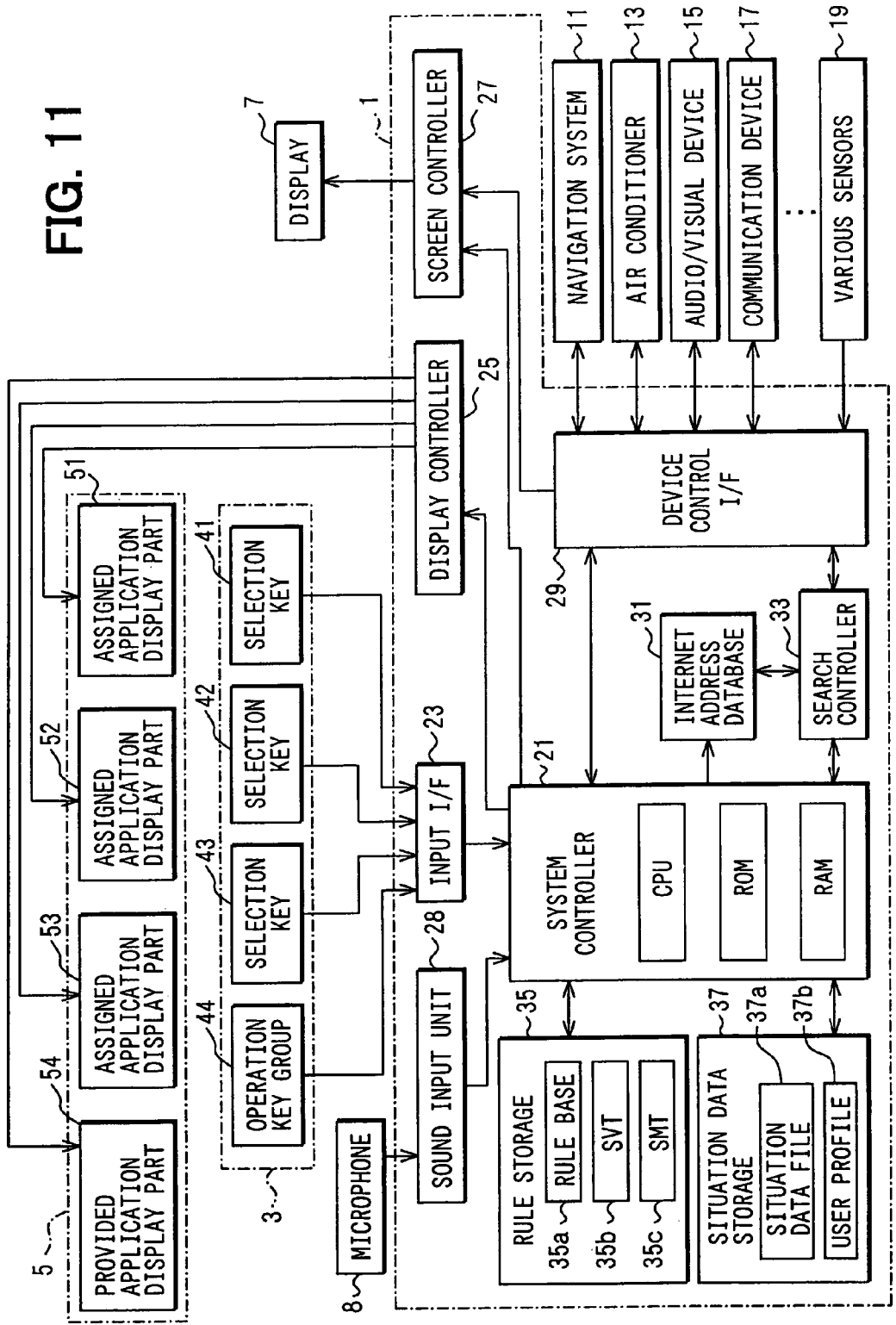

FIG. 12A
[RULE BASE: ONE-DIMENSIONAL RULE]

| CONDITIONAL CLAUSE | | RULE NUMBER R |
|---|---|---|
| SITUATION ATTRIBUTE | ATTRIBUTE VALUE | |
| SEASON | SPRING | 1 |
| | SUMMER | 2 |
| | FALL | 3 |
| | WINTER | 4 |
| DAY OF THE WEEK | MONDAY | 5 |
| | TUESDAY | 6 |
| | WEDNESDAY | 7 |
| | THURSDAY | 8 |
| | FRIDAY | 9 |
| | SATURDAY | 10 |
| | SUNDAY | 11 |
| TIME ZONE | MORNING | 12 |
| | DAY TIME | 13 |
| | AFTERNOON | 14 |
| | NIGHT | 15 |
| | MIDNIGHT | 16 |
| ... | ... | ... |

FIG. 12B
[RULE BASE: HIERARCHICAL RULE]

| | CONDITIONAL CLAUSE | | | | RULE NUMBER R |
|---|---|---|---|---|---|
| | SITUATION ATTRIBUTE | | | | |
| | PURPOSE | DESTINATION | WEATHER | ... | |
| ATTRIBUTE VALUE | BUSINESS | COMPANY | FINE | ... | K+1 |
| | | | CLOUDY | ... | K+2 |
| | | | ... | ... | ... |
| | | STATION | ... | ... | ... |
| | | AIRPORT | ... | ... | ... |
| | | ... | ... | ... | ... |
| | LEISURE | HOTEL | ... | ... | ... |
| | | AMUSEMENT PARK | ... | ... | ... |
| | | ... | ... | ... | ... |
| | ... | ... | ... | ... | ... |

FIG. 13A

[SCORING VECTOR TABLE (SVT)]

| RULE NUMBER R | SCORING VECTOR v | | | WEIGHTING FACTOR w | |
|---|---|---|---|---|---|
| | ATTRIBUTE B1 | ... | ATTRIBUTE BN | | |
| 1 | 30 | ... | 86 | 0.7 | |
| 2 | 50 | ... | 10 | 0.3 | FOR ONE-DIMENSIONAL RULE |
| 3 | 35 | ... | 26 | 0.5 | |
| ... | ... | ... | ... | ... | |
| i | ... | ... | ... | ... | |
| ... | ... | ... | ... | ... | |
| K+1 | 0 | ... | 100 | 0.9 | FOR HIERARCHICAL RULE |
| K+2 | 70 | ... | 70 | 0.8 | |
| ... | ... | ... | ... | ... | |

FIG. 13B

[SITUATION STORAGE TABLE (SMT)]

| DATA | DEMAND VECTOR/APPLICATION VECTOR | | | FEEDBACK INFO |
|---|---|---|---|---|
| | ATTRIBUTE B1 | ... | ATTRIBUTE BN | |
| JANUARY 1 | 60 | ... | 40 | 3 (SELECTION APPLICATION) |
| JANUARY 2 | 55 | ... | 10 | 1 (SELECTION APPLICATION) |
| JANUARY 3 | 24 | ... | 70 | 5→15 (ASSIGNMENT CHANGE) |
| ... | ... | ... | ... | ... |
| DECEMBER 24 | 26 | ... | 93 | 7→8 (ASSIGNMENT CHANGE) |
| ... | ... | ... | ... | ... |
| DECEMBER 31 | 50 | ... | 82 | 23 (SELECTION APPLICATION) |

EXAMPLE OF IMAGE EXPRESSION
OF RULE GROUPS

RULE GROUP A

RULE GROUP B

RESULT OF SUPERPOSITION
OF GROUPS A AND B

FIG. 24
RELATED ART

| SEASON | MONTH | DAY OF THE WEEK | TIME ZONE | WEATHER | PRESENT POSITION | DESTI-NATION | PURPOSE | DEPENDENT CLAUSE DETERMI-NATION |
|---|---|---|---|---|---|---|---|---|
| SPRING | MAR. | MON. | EARLY MORNING | FINE | HOME | AIRPORT | OVERSEAS BUSINESS TRIP | DETER. 11 |
| | | | | | | | DOMESTIC TRIP | DETER. 12 |
| | | | | | | | ... | ... |
| | | | | | | COMPANY | ROUTINE WORK | DETER. 21 |
| | | | | | | | MAIL | DETER. 22 |
| | | | | | | | PICKUP OF THING LEFT BEHIND | DETER. 23 |
| | | | | | | ... | ... | ... |
| | | | | | STATION | ... | ... | ... |
| | | | | | IN TRAIN | ... | ... | ... |
| | | | | | ... | ... | ... | ... |
| | | | | CLOUDY | HOME | ... | ... | ... |
| | | | | | ... | ... | ... | ... |
| | | | | ... | ... | ... | ... | ... |
| | | | BEFORE BREAK. | FINE | ... | ... | ... | ... |
| | | | | ... | ... | ... | ... | ... |
| | | | MORNING | ... | ... | ... | ... | ... |
| | | | LUNCH TIME | ... | ... | ... | ... | ... |
| | | | AFTER-NOON | ... | ... | ... | ... | ... |
| | | | EVENING | ... | ... | ... | ... | ... |
| | | | ... | ... | ... | ... | ... | ... |
| | | TUE. | ... | ... | ... | ... | ... | ... |
| | | ... | ... | ... | ... | ... | ... | ... |
| | | SUN. | ... | ... | ... | ... | ... | ... |
| | APR. | MON. | ... | ... | ... | ... | ... | ... |
| | | ... | ... | ... | ... | ... | ... | ... |
| | MAY | MON. | ... | ... | ... | ... | ... | ... |
| | | ... | ... | ... | ... | ... | ... | ... |
| SUMMER | JUN. | ... | ... | ... | ... | ... | ... | ... |
| | JUL. | ... | ... | ... | ... | ... | ... | ... |
| | AUG. | ... | ... | ... | ... | ... | ... | ... |
| FALL | SEP. | ... | ... | ... | ... | ... | ... | ... |
| | OCT. | ... | ... | ... | ... | ... | ... | ... |
| | NOV. | ... | ... | ... | ... | ... | ... | ... |
| WINTER | DEC. | ... | ... | ... | ... | ... | ... | ... |
| | JAN. | ... | ... | ... | ... | ... | ... | ... |
| | FEB. | ... | ... | ... | ... | ... | ... | ... |

INTERFACE DEVICE, INFERRING SYSTEM, AND VISUAL EXPRESSION METHOD

CROSS REFERENCE TO RELATED APPLICATIONS

This application is based on and incorporates herein by reference Japanese Patent Applications No. 2004-56579 filed on Mar. 1, 2004, and No. 2004-66195 filed on Mar. 9, 2004. This application is further based on and incorporated herein by reference Japanese Patent Applications No. H10-162457 filed on Jun. 10, 1998 (JP-H11-351901 A, U.S. application Ser. No. 09/328,339), No. H10-184840 filed on Jun. 30, 1998 (JP-2000-020090 A, U.S. application Ser. No. 09/328,339), No. 2000-285521 filed on Sep. 20, 2000 (JP-2002-092029 A, U.S. application Ser. No. 09/954,300, US-2002065836 A), and No. 2002-57307 filed on Mar. 4, 2002 (JP-2003-256466 A, U.S. application Ser. No. 10/373,683, US-2003167263 A).

FIELD OF THE INVENTION

The present invention relates to an interface device used when the user selects items of contents (or contents items) to be processed in various information devices typified by an in-vehicle information terminal, a PDA, a cellular phone, a notebook-sized personal computer, and the like.

The invention further relates to an inferring system for making inference using a rule expressed in an If-Then form in relation to the interface device, and to a visual expression method of a group of rules used in the inferring system.

BACKGROUND OF THE INVENTION

Hitherto, in an information device, to select contents items (including various applications and information) to be processed, a number of operation buttons are provided. Contents items are assigned to the operation buttons. A menu is displayed on a display screen, so contents items can be selected on the screen with a jog dial, or the like while switching a display state.

When the operation buttons are correspond to contents items, the following problem takes place. In short, since the space for the operation buttons is limited in a portable device or a device installed in a limited space such as a vehicle, it cannot handle many contents items.

When a menu is displayed on a display screen by using a hierarchical menu, selection can be made from a large number of contents items. However, this requires much effort (many operations) to reach a target function or information.

There are known apparatuses solving the problems: an apparatus of setting display conditions for each piece of information and giving permission to display only information whose display conditions are satisfied by an operation of the user, thereby automatically narrowing information to be displayed (refer to, for example, Patent Document 1); and an apparatus enabling a target contents item to be specified by a small number of operations (utterance) without performing hierarchical selecting operations by using speech recognition (refer to, for example, Patent Document 2).

Patent Document 1: JP-2000-112604 A

Patent Document 2: JP-2000-20090 A

In the apparatus disclosed in Patent Document 1, since the number of pieces of information displayed in a menu of each levels of the hierarchy is reduced, the selecting operation in each level is easy. However, a number of operations are still necessary to reach target information and the apparatus has a first problem such that the apparatus is not suitable for an environment in which the highest priority is placed on safety as in an in-vehicle device.

The user has to check the display screen many times and perform a necessary operation each time to reach target information. While the user performs the operation, attention to driving may deteriorate.

In the apparatus disclosed in Patent Document 2, since speech recognition is used, erroneous recognition of voice cannot be avoided. The apparatus has a second problem that the user has to repeat the same operation (utterance) many times in some instances.

Meanwhile, a rule-based inferring system is known as a system used for an apparatus for selecting contents items to be selected and the like is known (refer to, for example, Non-Patent Document 1).

This system expresses the knowledge of an expert in a rule form (If-Then form) and a rule is applied to a given question, thereby obtaining a solution.

An example of a rule used in an inferring system of this kind is shown as follows (1). The rule is used at the time of determining a destination adapted to a situation statement given on the basis of the destination description.

$$\text{IF } \{(\text{season}=\text{summer}) \text{ AND } (\text{weather}=\text{clear}) \text{ AND } (\text{hobby}=\text{swimming})\} \text{THEN } \{\text{sea}\} \qquad (1)$$

In a condition clause of the rule, a logical determination on a situation statement of whether each of attributes to be considered (in this case, "season," "weather," and "hobby") satisfies a linguistic or numerical condition (in this case, "summer," "clear," and "swimming") or not is described. In the case where the condition described in the condition clause is satisfied, one determination ("sea" in this case) to be made by the system is described in a dependent clause of the rule.

As one of applications of such an inferring system, a system of executing a control (for example, "transmission of an emergency message from the system to a center," "playing of music," "switch-on of a TV to show news," and "preparation of a bath") in accordance with a result of inference obtained by the inferring system is known.

In an inferring system, in some cases, a plurality of rules which hit (satisfy the conditional clause) exist (that is, a plurality of inference results are obtained) in a given situation depending on the way of making rules. In such a case, for example, in the application apparatus, a control may be executed only on a rule which is hit for the first as a rule satisfying the conditional clause or a control may be executed on all of hit rules in order of hit.

In this case, however, there is a possibility that a rule having higher propriety is hit after a rule having low propriety. In this case, the inferring system makes a decision which is not always optimum (or which is erroneous in some cases). When it is in an optimum value search question, it corresponds to local optimization.

To solve such a problem, all of a rule group has to be constructed so that one situation description hits only one rule.

Non-Patent Document: Yoji Masubuchi, "A research and development of Mobile Workflow System for Field Service with Case and Rule Based Reasoning)" the 43rd groupware and network service workshop of Information Processing Society of Japan, GN-43-20 (2002).

However, it has to be constructed so that logics of conditional clauses of the rules are contrary to each other (it corresponds to direct sum division of the space of situation description). It is requested to describe situations so as to be completely divided in hierarchy.

FIG. 24 shows a table of rules in a hierarchy. When it is assumed that N attributes of a situation description exist and the resolution of each attribute i (i=1 to N) is $M_i$, the number of situations, that is, the number of rules Ns obtained by logical combinations is expressed by Equation (2).

$$N_S = M_1 \times M_2 \times \ldots \times M_N \quad (2)$$

The more various conditional descriptions such as the environment, situation, requirement, and state of the user are reflected in a conditional clause, the number of attributes increases. The more the precision of determining each of attributes is improved, the higher the resolution Mi becomes. As a result, the number of rules described becomes enormous. There is a third problem such that the number reaches a level which cannot be realized in some cases.

In this case, there is also a fourth problem such that, as understood also from Equation (2), when an attribute of situation description is added (N is added) later, an enormous number of rules has to be also added and rules cannot be added so easily.

Further, in the case of forming all of possible combination conditions into rules and describing all of the conditions, since a number of conditions having no noticeable characteristic and unrealistic conditions are included, there is a fifth problem such that it is not efficient to describe rules by the method.

Although the number of rules can be reduced by implementing only rules which seem to be important in application, in such a case, a sixth problem occurs such that fine inference cannot be made and it is difficult to determine an important rule (attribute).

SUMMARY OF THE INVENTION

To solve the first and second problems, it is a first object of the present invention to provide an interface device enabling the user to easily and instantaneously select a contents item to be processed.

To solve the third to sixth problems, it is a second object of the present invention to provide an inferring system capable of easily adding and changing a rule and dynamically performing adaptation to an individual and a situation. It is further a third object of the present invention to provide a method of visually expressing a rule group, which enables the relation of the rule group to be easily grasped and which is useful for designing of a rule and the like.

An interface device invented to achieve the first object has at least one unit to be operated which is used to select contents items to be processed. Demand estimating means obtains situation data for grasping a situation of a user and estimates a demand of the user on the basis of the situation data.

According to the estimated demand of the user, group priority setting means sets group priority as priority for each contents group obtained by classifying a number of contents items. In accordance with the set group priority, assigning means associates a contents group having high group priority with the unit to be operated.

After that, when the unit to be operated is operated, process object specifying means selects, as an object to be processed, one of contents items belonging to the contents group associated with the unit to be operated.

In the structure, a specific contents item is not fixedly associated with the unit to be operated but a contents group according to a demand of the user estimated from each situation is dynamically associated with the unit to be operated, thereby providing an interface adapted to a situation (a demand of the user).

Therefore, by the interface device of the invention, even when the number of units to be operated is much smaller than that of contents items, the user can easily and instantaneously select contents items belonging to a contents group adapted to a demand of the user at each time only by operating one of the units to be operated.

In other words, by using the interface device of the invention, a smart interface which does not bother the user can be provided.

The contents items include not only contents items of music and video images but also various application programs for realizing various functions and various information such as an address book and a Web search result. The contents items may be grouped by paying attention to rough categories such as music, video, and news or by paying attention to sub-divided categories such as genres of music and video (classic, jazz, pops, and the like).

The group recommendation order setting means sets a recommendation order of the contents group for each group family obtained by previously classifying the contents groups, and sets a recommendation order of the group family. The assigning means selects a group family that is high in the group family recommendation order in accordance with the group family recommendation order set by the group recommendation order setting means and associates the contents group at the top (highest) of the selected group family with the unit to be operated. It is sufficient to use large categories such as the music, video, and news as the group family.

In this case, similar contents groups belonging to the same group family can be prevented from being associated with a plurality of units to be operated, and the variety of contents items the user can select can be widened.

In this case, it is desirable that the interface device has group switching means for switching a contents group to be associated with the unit to be operated in accordance with the group family recommendation order which is set by the group recommendation order setting means. By the group switching means, a contents group assigned to the unit to be operated by the assigning means can be easily switched to another contents group in the same group family, and flexibility at the time of selecting contents items can be improved.

The group switching means can be constructed so as to switch a contents group in accordance with a pre-designated special operation to be performed on the unit to be operated or an operation to be performed on an auxiliary unit to be operated which is provided for the unit to be operated.

In the invention, at least part of the unit to be operated may be fixedly associated with a pre-designated group family. In this case, it is sufficient for the assigning means to always associate the unit to be operated with which a specific group family is fixedly associated with only contents group belonging to the group family.

In the invention, at least part of the unit to be operated may be fixedly associated with a pre-designated contents group.

Specifically, by fixedly associating a group family or a contents group always in a top (highest) position in the recommendation order with the unit to be operated, a process of setting the group recommendation order or the group family recommendation order can be lessened. In the case where contents groups are fixedly assigned to all of units to be operated, the assigning means is unnecessary and may be omitted.

The process object selecting means may select, as an object to be processed, contents items belonging to the contents group corresponding to the operated unit to be operated at random. To make contents items adapted more to a demand of the user selected, the following configuration is desirable.

Contents recommendation order setting means sets a recommendation order of each of contents items included in the contents group on the contents group unit basis in accordance with a demand estimated by the demand estimating means. According to the set contents recommendation order, the process object selecting means selects, as an object to be processed, one of contents items at the top (highest) of the contents recommendation order.

In this case, it is preferable to further include contents switching means for switching contents items to be selected by the process object selecting means in accordance with the contents recommendation order set by the contents recommendation order setting means. Specifically, a contents item selected by the process object selecting means can be easily switched to another contents item in the same contents group, so that flexibility of selection of contents items can be improved.

For example, the contents switching means may switch contents items each time the same unit to be operated is operated. In this case, specifically, it is sufficient to sequentially select, as an object to be processed, contents items in the contents recommendation order which is the highest next to the contents item being selected at present each time the same unit to be operated is operated.

According to another aspect of the invention, in a manner similar to the above, an interface device has at least one unit to be operated which is used for selecting a contents item to be processed. The demand estimating means obtains situation data for grasping a situation of a user and estimating a demand of the user on the basis of the situation data obtained.

According to the estimated demand, contents recommendation order setting means sets a recommendation order of contents items. According to the set contents recommendation order, assigning means associates a predetermined contents item at the top (highest) of the contents recommendation order with the unit to be operated.

After that, when the unit to be operated is operated, process object selecting means selects, as an object to be processed, a contents item associated with the operated unit to be operated.

In the invention, a specific contents item is not fixedly associated with the operation to be operated. According to the situation of the user, the contents item itself according to the demand of the user which is estimated from the situation is dynamically associated with the unit to be operated.

Therefore, the interface device having the structure can obtain effects similar to the above.

The interface device of the invention has input means used by the user to input the situation data, and the demand estimating means may obtain at least situation data which is input from the input means.

By constructing the device so that situation data can be input by the user, a demand of the user can be estimated more accurately and, moreover, an interface more accurately estimating a demand of the user can be provided.

Preferably, the unit to be operated has assignment result display means for displaying a result of assignment made by the assigning means so as to be able to recognize what (contents group or contents item) is assigned to the unit to be operated.

In particular, in the case where a contents group is assigned to the unit to be operated, even when there is assignment result display means, a contents item selected as an object to be processed cannot be seen. Consequently, it is desirable to further include process object display means for displaying a contents item selected as an object to be processed by the process object selecting means.

The unit to be operated may be realized by a push button switch or the like or as an electronic object on a display. In this case, display form setting means may set a display form of the electronic object (the unit to be operated or assignment result display means) in accordance with a demand estimated by the demand estimating means.

The display form includes a size, a position, a shape, a font, a color, motion, and the like and is set to attract more attention for the higher degree of a demand and to display an atmosphere according to the feelings of the user.

The number of the units to be processed is preferably a number that the user can recognize at a glance, i.e., specifically about three.

To achieve the second object, an inferring system of the present invention has rule storing means for storing a rule group constructed by a number of rules. In each of the rules, a linguistic or numerical condition is described as the conditional clause for one or more of a plurality of preset situation attributes; further, a scoring vector (SV) is described as the dependent clause to have the degree of a demand as a component for each of a plurality of preset demand attributes.

Scoring vector extracting means then obtains situation data for grasping a situation, determines whether a conditional clause of a rule stored in the rule storing means is sufficient or not on the basis of the situation data, and extracts a scoring vector as a component of the depending clause of each of rules determined to have sufficient conditional clauses.

Demand vector generating means then generates a demand vector having, as a component, the degree of a demand for each of the demand attributes in a state generally grasped from the situation data by performing a process of cumulating the scoring vectors extracted by the scoring vector extracting means. Inference result generating means generates an inference result on the basis of the generated demand vector.

Specifically, a conditional clause is constructed so as to allow a plurality of rules to be hit (so that the conditional clause is satisfied) for a certain situation setting and a scoring vector as a component of a dependent clause is superposed on all of the hit rules, thereby obtaining a demand rule in which all of the hit rules are reflected, and an inference result is obtained according to the demand vector.

Therefore, in the inferring system of the invention, even when a plurality of rules are hit, local optimization does not occur but an optimum inference result based on the whole hit rules can be obtained.

In the inferring system of the invention, the situation description is not performed in a lump to all of attributes but is divided into a plurality of pieces. Consequently, an independent inferring process can be executed for each of rule groups having different situation attributes (or combination).

Since description of the conditional clauses is independent on the rule group unit basis, as compared with the conventional device in which all of situation attributes are included in the conditional clauses, the number of rules to be set can be largely reduced. Moreover, additional correction of a rule and dynamic adaptation to an individual or a situation can be facilitated.

In the inferring system of the invention, by describing a dependent clause of a rule by using a scoring vector, a characteristic of a determination result can be expressed while leaving ambiguity in a dependent clause in each rule.

A rule group stored in the rule storing means may include a one-dimensional rule in which a linguistic or numerical condition for a single situation attribute is described in the conditional clause, or a hierarchical rule in which a linguistic or numerical condition for a plurality of situation attributes is described in the conditional clause. Alternatively, the rule group may include both of the one-dimensional rule and the hierarchical rule.

In the one-dimensional rule, only one situation attribute is included in the conditional clause, so that the degree of contribution to a demand attribute of the situation attribute is clear. A rule can be easily generated or corrected.

On the other hand, the hierarchical rule is suitable for description in the case where a specific logic condition expressed by a plurality of situation attributes has a special meaning, for example, description of a special case or an exceptional process.

In the hierarchical rule, the more the number of situation attributes included in a conditional clause increases, the more it becomes difficult to generate and correct a rule. Consequently, it is desirable to apply the hierarchical rule to a rule in which addition, correction, and charge is not so needed and a rule in which priority is given to simplification of a process. It is also desirable to reduce the number of situation attributes constructing a conditional clause, and to use a situation attribute having relatively low resolution.

In the inferring system according to the invention, a plurality of rule groups are stored in the rule storing means, and the scoring vector extracting means may select a rule group to be used in accordance with the situation data. In this case, only a rule group according to the situation is restrictively used, so that the inferring process can be executed adaptively and efficiently (moreover, at high speed).

As situation data, it is sufficient to use dynamic situation limitation information obtained from a user profile (including personal information, user type, natural environment, information environment, situation, demand, and state), change with time, change in place (including a change in the country), and the like. As the rule group according to the situation, for example, it is sufficient to use a rule group classified on the basis of a geographical condition (such as a rule group for Japan, a rule group for U.S.A., a rule group for China), a rule group classified on the basis of the user type (such as a rule group for men, a rule group for women, a rule group for children, and a rule group for adults), and rule group classified on the basis of a purpose (a rule group for work and a rule group for outing). Other than the above, it is sufficient to use rules grouped by function (corresponding to the dependent clause) or by situation category (corresponding to the conditional clause).

The demand vector generating means performs, specifically, weighted addition on the scoring vector as the cumulating process.

A drivable application may be associated with the demand attribute constructing each component of a scoring vector, or an estimated desire of the user may be associated with the demand attribute.

In the former case, an application to be driven can be inferred immediately from a demand vector obtained by a process of cumulating scoring vectors.

In the latter case, examples of the desire of the user are "I want to eat," "I want to play sports," "I want to be relaxed," "I want to refresh myself," "I want to go shopping," "I want to dress up," "I want to talk with someone," "I want to go somewhere," "I want to watch a movie," "I want to listen to music," and "I want to play a game." An application to be driven is not directly associated but it is sufficient to use a desire to an application in a potential state.

In this case, preferably, the demand vector generating means includes attribute converting means for converting a demand vector having, as the demand attribute, the desire of the user obtained by the cumulating process into a demand vector having a drivable application as the demand attribute.

When such attribute converting means is provided, at the time of adding a new application, it is unnecessary to change the scoring vector. Only by changing the attribute converting means, adaptation to an added application can be easily performed.

Further, preferably, when the scoring vector is set on the basis of a viewpoint of an average user, and the situation data includes at least viewpoint data indicative of a viewpoint of each user, the demand vector generating means has viewpoint converting means for converting a demand vector obtained by the cumulating process into a demand vector in which the viewpoint of the user is reflected on the basis of the viewpoint data.

In this case, it is unnecessary to reflect the characteristic (viewpoint) of each user in a rule group (particularly, scoring vector) itself, and the same rule group can be applied to all of users. Thus, increase in the scale of the rule group can be suppressed.

Specifically, the viewpoint converting means may convert the demand vector by using a coordinate conversion matrix and a translation vector.

Specifically, the scoring vector corresponds to a vector expressed by using a common coordinate system corresponding to the viewpoint of the average user, so that the viewpoint conversion can be realized by using the method of coordinate conversion.

Initial data of the scoring vector which is obtained by, for example, totaling evaluations of attribute values based on subjective determinations by a number of users and statistically averaging the evaluations can be used. As the method of totaling evaluations, it is sufficient to use a questionnaire (use of the Internet), a probe system, or the like.

In this case, however, enormous time and effort is required to collect data and it is relatively difficult to make fragmentary empirical rules easily estimated from common sense (for example, "in Japan, traffic jam occurs in the Buddhist festival of the dead, winter holiday, and consecutive holidays in May, and needs for traffic news increases") reflected explicitly.

As initial data of a scoring vector, data obtained by converting subjective rules of thumb (particularly, a rule made while placing importance on representative phases corresponding to the fragmentary empirical rules) made by a small number of users into numbers may be used.

In this case, it is difficult to specify a rule group adapted to all of phases a number of users face. Consequently it is preferable to also use a method of inferring a rule (particularly, a scoring vector) in a position which is not filled yet on the basis of the group of the small number of representative rules.

The initial data of the scoring vector may be preset or can be also set or reset by initial data setting means.

The initial data setting means may set, for example, as the initial data, input data from the outside or a template selected by an external operation from a preset template group.

The initial data setting means has initial data generating means for generating initial data of the scoring vector by inference on the basis of a user profile in which at least a preference of the user is described. Initial data generated by the initial data generating means may be set.

Even when initial data is set by any of the above-described methods or combination of the methods, a work amount by the initial data setting means is enormous. Consequently, it is difficult to prepare initial data of scoring vectors for all of possible situations (rules).

Preferably, the initial data setting means has initial data transferring means. When the rule group is classified into a plurality of partial rule groups constructed by rules in each of which a condition of the same situation attribute is described in the conditional clause, and initial data of a scoring vector is set in a certain rule, the initial data transferring means transfers the same initial data to scoring vectors of the other rules belonging to the same partial rule group to which the certain rule belongs. By using such initial data transferring means, it is sufficient to set one piece of initial data for each partial rule group. Thus, the number of rules to be set by the initial data setting means can be largely reduced.

The inferring system of the invention may also include inference characteristic correcting means for correcting an inference characteristic of the system on the basis of feedback information to an inference result generated by the inference result generating means.

In this case, the feedback information may be information related to the same user or another user.

The inference characteristic correcting means may correct a inference characteristic when, for example, a correction request is received from the outside. Alternatively, when a preset correction condition is satisfied, the inference characteristic correcting means may obtain feedback information and, on the basis of the feedback information, correct the inference characteristic. In this case, the feedback information may be a demand vector used to generate an inference result by the inference result generating means, and response data indicative of a response of the user to whom the inference result was presented. In this case, a history of the feedback information may be stored in history storing means.

The correction condition is regarded to be satisfied in the following cases: where there is a difference equal to or larger than a preset threshold value between an operation vector generated from the response data and a demand vector associated with the response data in accordance with the feedback information; or where it is statistically recognized that there is a difference equal to or larger than the threshold value between the vectors on the basis of history of the feedback information in a preset period. The inference characteristic may be corrected on the basis of a target rule as the rule related to the demand vector satisfying the correction condition.

The inference characteristic correcting means corrects the inference characteristic by the following. Specifically, the value of a scoring vector is changed as a component of the dependent clause of the target rule; a linguistic or numerical condition is changed as a component of the conditional clause of the target rule; a new rule obtained by sub-dividing the linguistic or numerical condition is added as a component of the conditional clause of the target rule; or a new situation attribute is set on the basis of the target rule to then add a rule corresponding to the situation attribute.

At the time of generating the demand vector by the demand vector generating means, the inference characteristic correcting means may correct the inference characteristic by changing a value of a parameter used for a scoring vector as a component of a dependent clause of the target rule; or the inference characteristic correcting means may add or change description of the situation data exerting an influence on determination of a conditional clause, particularly, description of a user profile in which at least a preference of a user is described.

In the inferring system of the invention, response detecting means may detect a response from the user to whom an inference result generated by the inference result generating means. When the response detected by the response detecting means is an affirmative response to the inference result, rule enhancing means may set a rule related to a demand vector used to obtain the inference result as a rule to be enhanced, and enhance the rule to be enhanced. It is assumed that "no negative response to the inference result" is also included in the "affirmative response to the inference result."

When neighborhood of a conditional clause of the rule to be enhanced can be defined, the rule enhancing means may also set a rule having a conditional clause included in the neighborhood as an object to be enhanced.

In the case of enhancing a rule in the neighborhood, it is preferable to make the enhancement amount smaller than that of the rule to be enhanced. The neighborhood denotes that, for example, a situation attribute as a component of the conditional clause of a rule is included in a category similar to that of the original rule to be enhanced (the same partial rule group).

The rule enhancing means may enhance the rule to be enhanced by changing a parameter (for example, a weighting factor used at the time of weighted addition) used at the time of generating the demand vector from a scoring vector as a component of a dependent clause of the rule to be enhanced by the demand vector generating means or by increasing the value of a scoring vector as a component of a dependent clause of the rule to be enhanced.

As described above, the inferring system of the invention can correct or enhance the inference characteristic, so that adaptation to an individual or a situation can be performed dynamically.

To achieve the third object, a method of visually expressing a rule group is provided as follows. Specifically, in a rule, a linguistic or numerical condition for at least one of a plurality of preset situation attributes is described in a conditional clause, and a scoring vector having, as a component, the degree of a demand for each of a plurality of preset demand attributes is described in a dependent clause. Two of the situation attributes are associated with a two-dimensional address for specifying each of tile images two-dimensionally arranged, and three of the demand attributes are associated with three primary colors expressing colors of the tile images.

In short, by introducing a scoring vector in description of a rule, a linear weighted sum process among rules can be easily performed.

By using the rule group visual expressing method, a system designer and the user can visually grasp the characteristics (such as periodicity of a scoring vector and space dependency) of a rule group from a distribution of colors of a tile image. Specifically, macro characteristics of a user, similarities between different users, and statistical characteristics common to many users can be also visually grasped. By visualizing the characteristics of the rule group, edition and processing (such as transfer of a rule in the same user or between different users) on a rule group can be easily performed by using a known image processing method which is executed on a display.

Further, by introducing a vector space and image expression into expression of a rule group, updating of history of rule groups, and retrieval and recognition of a rule (group) having a specific pattern can be easily performed.

Alternatively, two conditions which are dominant in rule designing among situation attributes are made correspond to a two-dimensional address for specifying an image tile. Each image tile is constructed by a plurality of partial image tiles and the remaining situation attributes are made correspond to relative addresses for specifying the partial image tiles. In this case, a larger number of situation attributes can be reflected in a single image expressing a characteristic of a rule group.

BRIEF DESCRIPTION OF THE DRAWINGS

The above and other objects, features, and advantages of the present invention will become more apparent from the following detailed description made with reference to the accompanying drawings. In the drawings:

FIG. 5 is a diagram illustrating an example of execution of the selection key setting process;

FIG. 6 is a diagram illustrating an example of execution of the selection key setting process;

FIG. 11 is a block diagram showing the configuration of an interface device of a third embodiment;

FIGS. 12A and 12B are diagrams showing the configuration of a rule base;

FIG. 13A is a diagram showing the configuration of a scoring vector table;

FIG. 13B is a diagram showing the configuration of a situation storage table;

FIG. 24 is a diagram showing the configuration of rules of a related art.

DETAILED DESCRIPTION OF THE PREFERRED EMBODIMENTS

Embodiments of the invention will be described below in conjunction with the drawings.

First Embodiment

Figure 1:
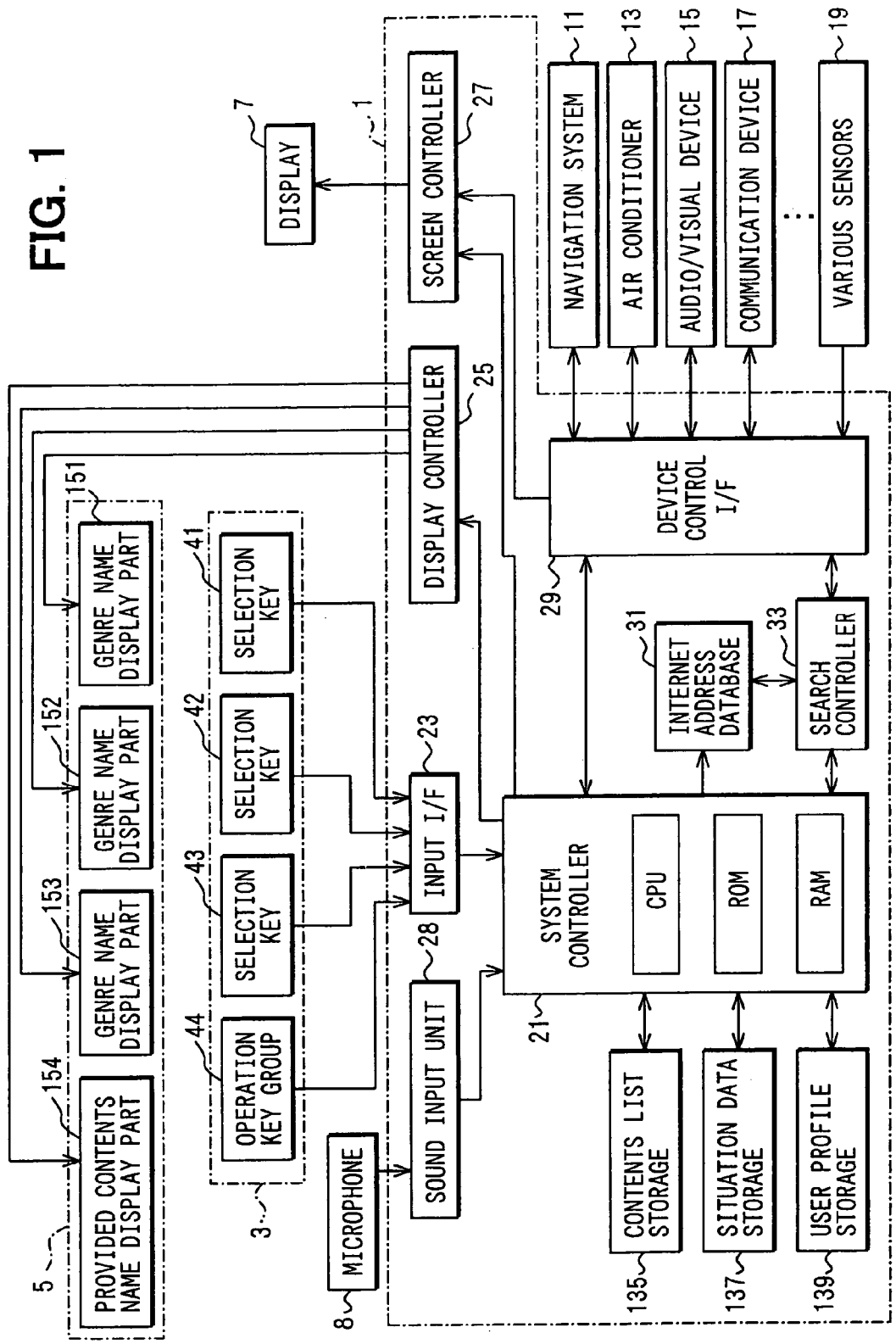
FIG. 1 is a block diagram showing the configuration of an interface device of a first embodiment.

FIG. 1 is a block diagram showing the configuration of an interface device 1 of a first embodiment. The interface device 1 is a device which is mounted in a car (vehicle) and enables an occupant (mainly, the driver) of the vehicle to use various services (such as display of a video image, playback of music, Web search, server connection, and speech recognition) using various devices mounted in the vehicle. Hereinbelow, the provided services will be generically called contents items.

As shown in FIG. 1, the interface device 1 of the embodiment is connected to the following: an input device 3 having selection keys 41 to 43 used to select contents items and an operation key group 44 for entering various commands, data, and the like by an external operation; a display device 5 having genre name display parts 151 to 153 for displaying genre names of contents items associated with the selection keys 41 to 43, respectively, and a provided contents name display part 154 for displaying a contents name being provided; a display 7 for displaying an image; and a microphone 8 for inputting voice.

The operation key group 44 includes at least a start key and situation setting keys used for inputting situation data (for example, season, weather, purpose, destination, information, user situations, and the like) used for processes to be described later.

As shown in FIG. 5, the selection keys 41 to 43 are push button switches formed integrally with the genre name display parts 151 to 153, respectively and arranged in a lower part of the display 7. The shape, color, and size of each of the selection keys 41 to 43 are designed to be easily recognized and operated by an occupant (particularly, driver) of the vehicle. Although not shown, the operation key group 44 and the provided contents name display part 154 are disposed near the selection keys 41 to 43.

The interface device 1 is also connected to the following: a known navigation system 11 for performing detection of the present position (present location) of the vehicle, guidance of a route, and the like; an air conditioner 13 for controlling the air condition in the vehicle; an audio/visual device 15 constructed by a cassette tape recorder, a CD (compact disc) player, an MD (mini disc) player, a radio, a video recording/reproducing apparatus, a television, and the like; a communication device 17 for performing data communication by radio between a broadcast terminal of a known VICS (Vehicle Information and Communication System) and an Internet broadcast terminal as a connection port to the Internet; various sensors 19 for detecting a camera image, vehicle operating conditions such as vehicle speed and accelerating/decelerating state, temperatures on the inside/outside of the vehicle, the presence/absence of raindrops, and the like; and other controllers (not shown) for controlling a door lock of the vehicle, a window glass (power window), an engine, a brake device, and the like.

The navigation system 11 includes a known GPS device for detecting the present position of the vehicle; a CD-ROM storing navigation data such as map data, place name data, and facility name data; a CD-ROM drive for reading data from the CD-ROM; and an operation key used by the user to enter a command. For example, when a command requiring a destination and navigation to the destination is input by the operator with an operation key, the navigation system 11 displays a road map including the present position of the vehicle and the optimum route to the destination on the display 7 and performs navigation.

On the display 7, a road map for navigation is displayed by the navigation system 11 and various images such as a menu for information search are also displayed. When the audio/visual device 15 is set in a television mode, a television image received by a television tuner provided for the audio/visual device 15 is also displayed. When the audio/visual device 15 is set in a video playback mode or a camera display mode, a corresponding image is displayed.

The interface device 1 also has: a system controller 21 constructed mainly by a microcomputer including a CPU, a ROM, and a RAM; an input interface (I/F) 23 for inputting a command and data from the input device 3 to the system controller 21; a display controller 25 for controlling display of the parts 151 to 154 constructing the display device 5; a screen controller 27 for controlling a display screen of the display 7; a sound input unit 28 for converting a sound signal which is input from the microphone 8 into digital data and inputting the digital data to the system controller 21; and a device control interface (I/F) 29 for connecting the display 7, the navigation system 11, the air conditioner 13, the audio/visual device 15, the communication device 17, the various sensors 19, and other controllers to the system controller 21 so that data communication can be performed.

The interface device 1 has an Internet address database 31 for storing addresses in the Internet (Internet addresses) to retrieve and obtain desired information from the Internet by the communication device 17 and a search controller 33. When the system controller 21 outputs a search keyword indicative of information to be retrieved to the search controller 33, the search controller 33 operates the communication device 17 via the device control I/F 29 to retrieve information corresponding to the search keyword from an Internet broadcast terminal and input the search result to the system controller 21. In the Internet address database 31, Internet addresses used in the past by the search controller 33 are stored by a command from the system controller 21. When the same search keyword as that input in the past from the system controller 21 is received, the search controller 33 re-uses the Internet address in the Internet address database 31.

The interface device 1 further includes: a contents list storage 135 storing various contents lists which can be provided via the interface device 1 and classified in genres (for example, contents groups such as video images, music, or Internet; commands; user's utterance; and the like) and a list of genres; a situation data storage 137 storing situation data indicative of situations of the user, the environment of the user, and the like (for example, season, weather, purpose, destination, information, user situations, and the like); and a user profile storage 139 storing personal information of a plurality of users (hereinbelow, also called user profile).

Situation data other than the above-described situation data may be used when it exerts an influence on requests and actions of the user. The "information" described as an example of the situation data is information of important interests for many people such as "a typhoon is approaching," "the World Cup is being held" and the like. The user situations indicate the action, physical condition, feeling, and the like of the user at each time.

As the user profile, the preferences and contents selection history of each user are stored so as to be associated with various situations such as time situations (time zone, season, anniversary, and the like), geographical situations, and feeling situations.

Each of the contents list storage 135, situation data storage 137, user profile storage 139, and Internet address database 31 is constructed by a data readable/writable nonvolatile memory.

Figure 2:
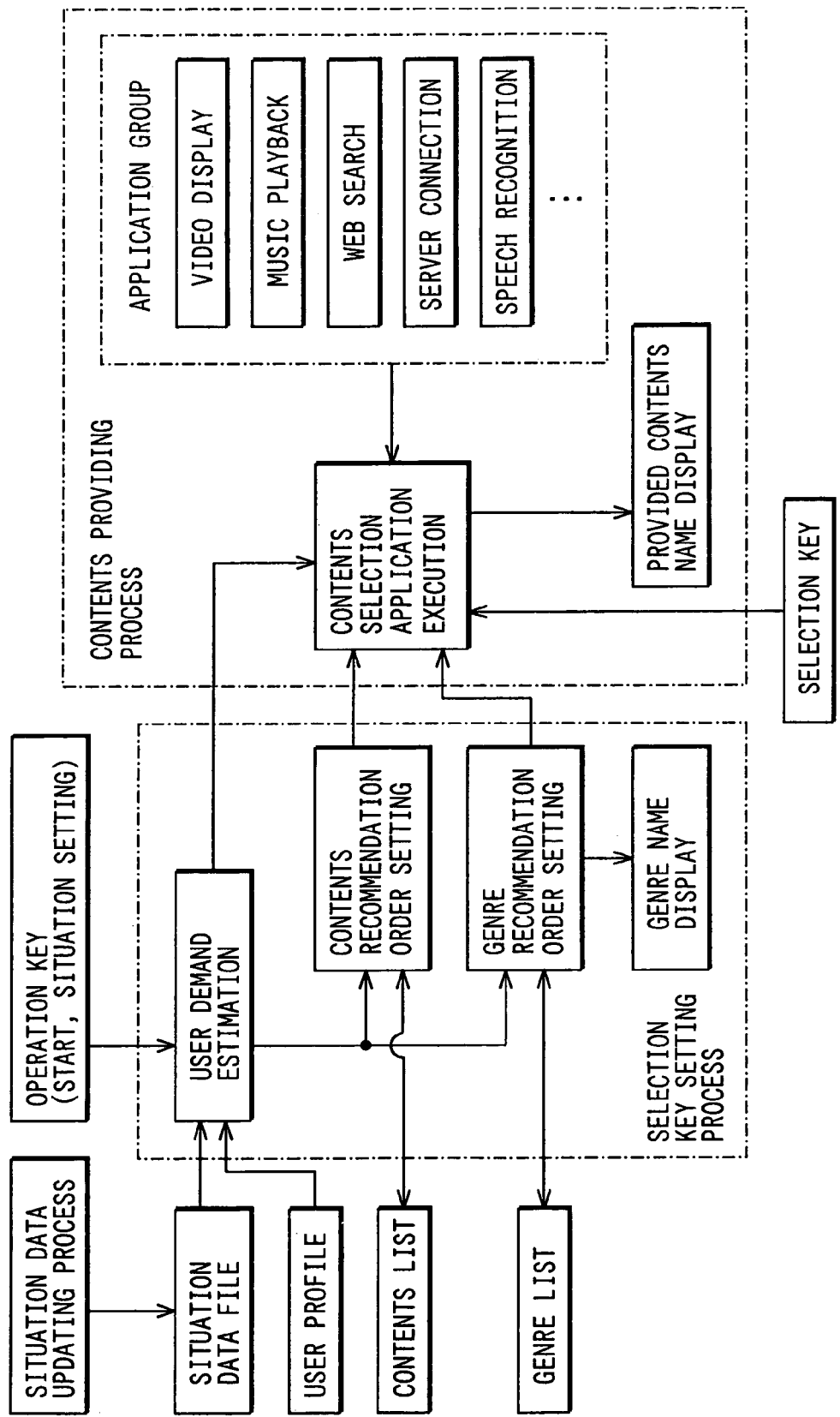
FIG. 2 is a functional block diagram of the interface device.
Figure 3:
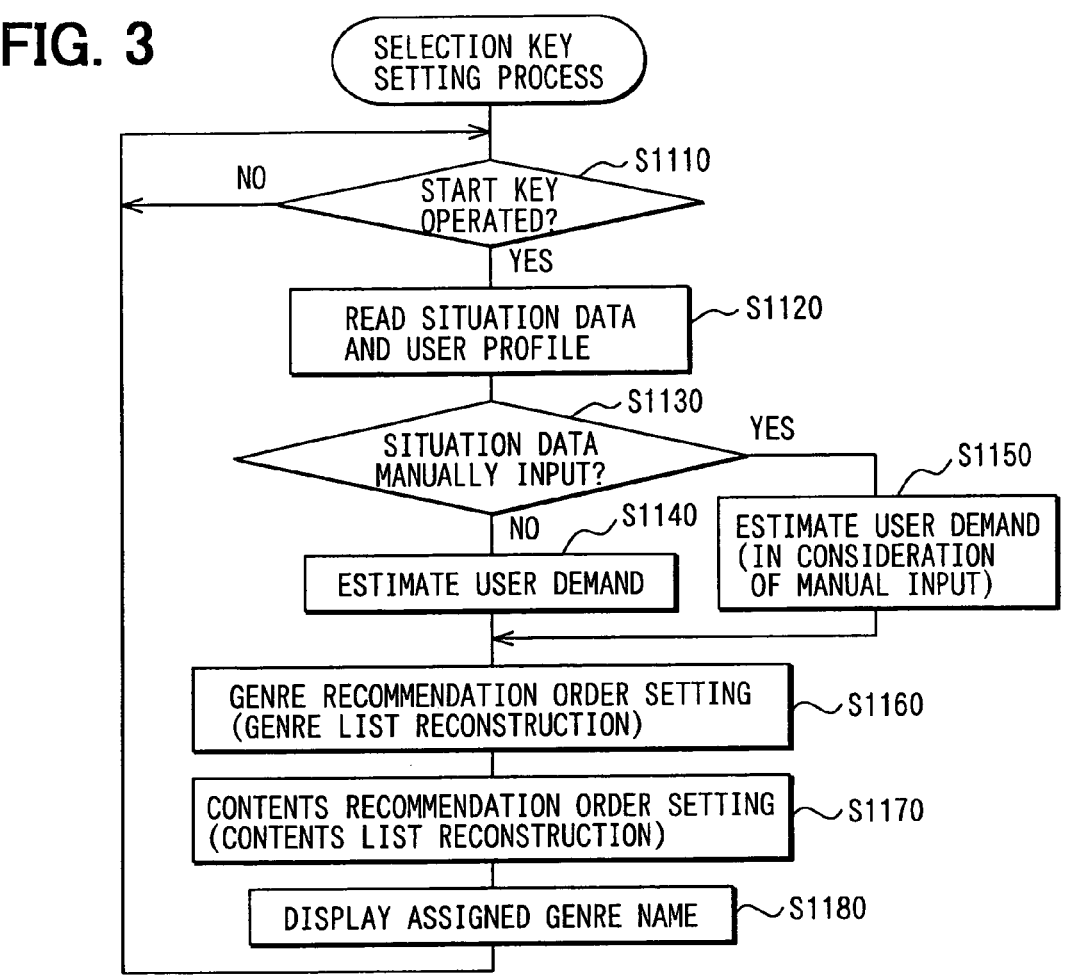
FIG. 3 is a flowchart showing the details of a selection key setting process.
Figure 4:
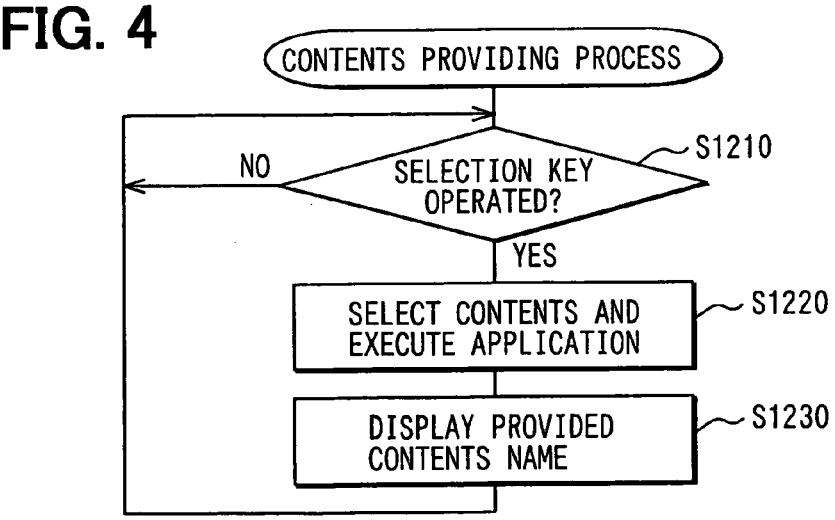
FIG. 4 is a flowchart showing the details of a contents providing process.

An outline of processes executed by the system controller 21 in the interface device 1 constructed as described above will now be described with reference to the functional block diagram of FIG. 2 and the flowcharts shown in FIGS. 3 and 4.

The CPU as a component of the system controller 21 executes a selection key setting process of associating genres of contents items with the selection keys 41 to 43, a contents providing process of providing contents items in accordance with operations on the selection keys 41 to 43, and a situation data updating process of updating situation data with information collected by the communication device 17 and the various sensors 19.

In the ROM as a component of the system controller 21, a program for executing the selection key setting process, contents providing process, and situation data updating process and various application programs for executing a process necessary to provide contents items and a control of a device group 10 (for example, a video display application, a music playback application, a Web search application, a server connection application, and a sound recognition application) are stored.

First, the selection key setting process will be described with the flowchart shown in FIG. 3.

When the process starts, whether a start key as one of the operation key group 44 is operated or not is determined (S1110). When the start key is not operated, the device waits by repeatedly executing the step. When the start key is operated, the situation data is read from the situation data storage 137 and the user profile is read from the user profile storage 139 (S1120).

The presence or absence of a manual input of the situation data via a situation setting key as one of the operation key group 44 is determined (S1130). When there is no manual input of the situation data, an inferring process of inferring a request of the user is executed on the basis of the situation data and the user profile read in S1120 (S1140). On the other hand, when there is a manual input of the situation data, an inferring process of inferring a request of the user is executed on the basis of the manually input situation data in addition to the situation data and the user profile read in S1120 (S1150). For the details of the inferring process corresponding to or related to the present invention, refer to US-2003167263 A, US-2002065836 A, JP-H11-351901 A, JP-2000-020090 A, and the like.

On the basis of the result of inference in S1140 or S1150, each of the genres in the genre list stored in the contents list storage 135 is evaluated and the genre list is reconstructed so that the genres are arranged in descending order of the inferred degree of demand (hereinbelow, called "genre recommendation order") (S1160).

Subsequently, on the basis of the result of inference, each of the contents items in the contents list in each of the genres is evaluated and the contents list is reconstructed so that the contents items are arranged in descending order of the inferred degree of demand (hereinbelow, called "contents recommendation order") (S1170). The contents list may be reconstructed with respect to all of the genres or with respect to only genres in higher places in the genre recommendation order.

The top three genres extracted from the genre list reconstructed in S1160 are associated with the selection keys 41 to 43, and the names of the associated genres or labels of the genres are displayed in the genre name display parts 151 to 153 (S1180) and the program returns to S1110.

At the time of performing the display in the genre name display parts 151 to 153 in step S1180, the display may be optimized (for example, display size, a use font background image, and the like) in accordance with environments specified from the situation data and the preferences of the user specified from the user profile.

In short, when the start key is operated, based on a demand of the user inferred from the present situations (situation data) and the user's preferences (user profile), the genre recommendation order and the contents recommendation order of each genre are set, and the top three genres extracted according to the genre recommendation order are associated with the selection keys 41 to 43.

The contents providing process will now be described with the flowchart of FIG. 4.

When the process starts, first, whether the selection keys 41 to 43 are operated or not is determined (S1210). When the selection keys 41 to 43 are not operated, the device waits by repeatedly executing the step. On the other hand, when the selection keys 41 to 43 are operated, a contents item is selected from the contents list of the genre associated with the operated selection key, and an application program necessary to provide the selected contents item is executed (S1220).

The name of the contents item selected in S1220, that is, the provided contents item or the label indicative of the provided contents item is displayed in the provided contents name display part 154 (S1230) and the program returns to S1210.

In the selection of a contents item in S1220, when an operation is the first operation performed on the selection key after execution of the selection key setting process, the contents item at the top (or highest) in the contents recommendation order, positioned at the head of the corresponding contents list is selected. Each time the same selection key is operated, the next highest contents item in the recommendation order is selected.

At the time of executing an application in S1220, the application may be optimized (for example, change of the image size, frame rate, and modality (presentation form), resolution, volume, memory resource, and the like) in accordance with environments specified from the situation data and the user's preferences specified from the user profile.

In short, when the selection keys 41 to 43 are operated, the contents item at the top in the contents recommendation order in the genre associated with the operated selection key is provided. Each time the same selection key is operated, the contents item to be provided is switched in accordance with the contents recommendation order of the genre.

A specific example of the operation in the selection key setting process will now be described.

In the following, the selection keys 41 to 43 will be called buttons 1 to 3, respectively.

(1) Case A (Refer to FIG. 5)

A situation in which the user is heading for an airport for an overseas business trip and a typhoon is approaching is assumed.

A profile of situation data in the situation (situation description A1), setting of the buttons 1 to 3 (button assignment) as a result of operation of the start key in the situation, and a reconstructed contents list (in this case, genre of "news") are as follows.

Situation Description A1

| | |
|---|---|
| season: | summer |
| weather: | rain |
| purpose: | overseas business trip |
| destination: | Nagoya Airport |
| information: | typhoon is approaching |
| user situation: | driving |
| Button assignment | |
| (button 1, button 2, button 3) = | (news, weather, road information) |

Contents List (News)
1. news of winds
2. current events
. . .
K. politics
. . .
N. entertainment A situation in which time elapsed from the above-described situation and the user arrived at the airport is now assumed.

A profile of situation data in the situation (situation description A2) and setting of the buttons 1 to 3 (button assignment) as a result of operation of the start key in the situation are as follows. According to the change in the user situation, the button assignment is also updated so as to be adapted to the user situation.

Situation Description A2

| | |
|---|---|
| season: | summer |
| weather: | rain |
| purpose: | overseas business trip |
| destination: | Sydney |
| information: | typhoon is approaching |
| user situation: | arrived at the airport |
| Button assignment | |
| (button 1, button 2, button 3) = | (exchange rate, weather, facility guide) |

(2) Case B (Refer to FIG. 6)

A situation in which the user is driving on a highway in consecutive holidays in May and heading for a hotel in Yokohama is assumed.

A profile of situation data in the situation (situation description B1), setting of the buttons 1 to 3 (button assignment) as a result of operation of the start key in the situation, and a reconstructed contents list (in this case, genre of "news") are as follows.

Situation Description B1

| | |
|---|---|
| season: | spring (consecutive holidays in May) |
| weather: | clear |
| purpose: | trip |
| destination: | a hotel in Yokohama |
| information: | the World Cup is being held |
| user situation: | driving on highway |
| Button assignment | |
| (button 1, button 2, button 3) = | (sports, jazz, road information) |

Contents List (News)
1. news of World Cup
. . .
K. baseball news
. . .
N. golf news A situation in which time elapsed from the above-described situation and the user arrived at the airport is now assumed.

A profile of situation data in the situation (situation description B2) and setting of the buttons 1 to 3 (button assignment) as a result of operation of the start key in the situation are as follows. In a manner similar to Case 1, according to the change in the user situation, the button assignment is also updated so as to be adapted to the user situation.

Situation Description B2

| | |
|---|---|
| season: | spring (consecutive holidays in May) |
| weather: | clear |
| purpose: | trip |
| destination: | hotel in Yokohama |
| information: | event in stadium |
| user situation: | driving with family in Yokohama city |
| Button assignment | |
| (button 1, button 2, button 3) = | (road information, map of the site, tourist information) |

As described above, in the interface device 1 of the embodiment, specific contents items are not fixedly associated with the selection keys 41 to 43 but genres according to demands of the user inferred from the situation are dynamically associated with the selection keys 41 to 43.

Consequently, in the interface device 1 of the embodiment, although the number of the selection keys 41 to 43 is much smaller than the number of contents items, contents items belonging to a genre adapted to the demand of the user in each of occasions can be easily and instantaneously selected only by depressing a single selection key.

In other words, by using the interface device 1 of the embodiment, an easy-to-operate useful interface can be provided.

In the embodiment, the selection keys 41 to 43 function as parts to be operated, a genre functions as a contents group, the genre name display parts 151 to 153 function as assignment display means, the provided contents name display part 154 functions as display means to be processed, S1140 and S1150 function as request estimating means, S1160 functions as group recommendation order setting means, S1170 functions as contents recommendation order setting means, S1180 functions as assigning means, and S1220 functions selecting means to be processed and contents switching means.

Second Embodiment

A second embodiment is similar to the first embodiment except for the configuration of the genre list and part of the processes executed by the system controller 21, so that the parts different from the first embodiment will be mainly described.

Figure 7:
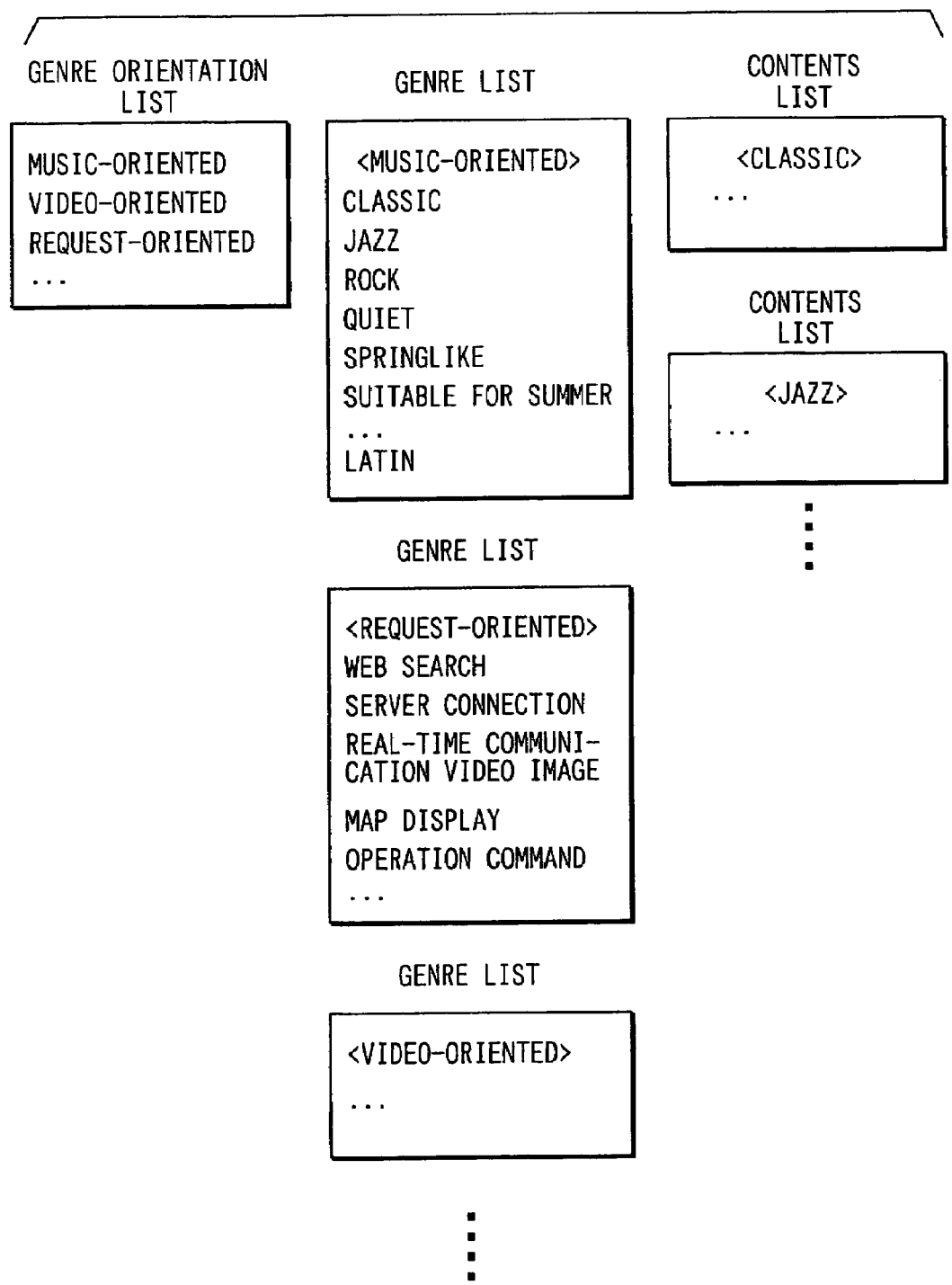
FIG. 7 is a diagram showing an example of the configurations of lists stored in a contents list storage in a second embodiment.

First, in the second embodiment, in the contents list storage 135, as shown in FIG. 7, a genre orientation list of preset genre orientations (genre families or genre groups) (such as visual-oriented genre, music-oriented genre, and request-oriented genre), a genre list generated for each genre orientation, and a contents list generated for each genre list are stored.

The music-oriented genre list includes not only normal music genres such as "classic," "jazz," "rock," and "Latin" but also sensory genres such as "quiet," "springlike," and "suitable for summer." The request-oriented genre list includes, for example, "Web search," "server connection," "real-time communication video image," "map display," and "operation command."

In the selection key setting process, the processes in S1160 and S1180 are different from those in the first embodiment.

Specifically, in S1160 in the second embodiment, each of the genre orientations of the genre orientation list stored in the contents list storage 135 is evaluated on the basis of the result of inference in S1140 or S1150, and the genre orientation list is reconstructed so that the genre orientations are arranged in descending order of the inferred degree of demand of the user (hereinbelow, called "orientation recommendation order"). Each of the genres of the genre list stored in the contents list storage 135 is evaluated and the genre list is reconstructed so that the genres are arranged in descending order of the inferred degree of demand of the user. The reconstruction of the genre list may be performed with respect to all of genre orientations or only high genre orientations in the orientation recommendation order.

In S1180, the top three genre orientations are selected from the genre orientation list reconstructed in S1160, the genres at the top in the genre orientation order in the selected genre orientations are associated with the selection keys 41 to 43, and the names of the associated genres or labels indicative of the genres are displayed in the genre name display parts 151 to 153.

In short, when the user operates the start key, on the basis of the demand of the user inferred from the present situation (situation data) and the preference of the user (user profile), setting of the orientation recommendation order, setting of the genre recommendation order of each genre orientation, and setting of the contents recommendation order of each genre are made. The genres at the top in the recommendation order of the top three genre orientations extracted in accordance with the orientation recommendation order are associated with the selection keys 41 to 43.

Figure 8:
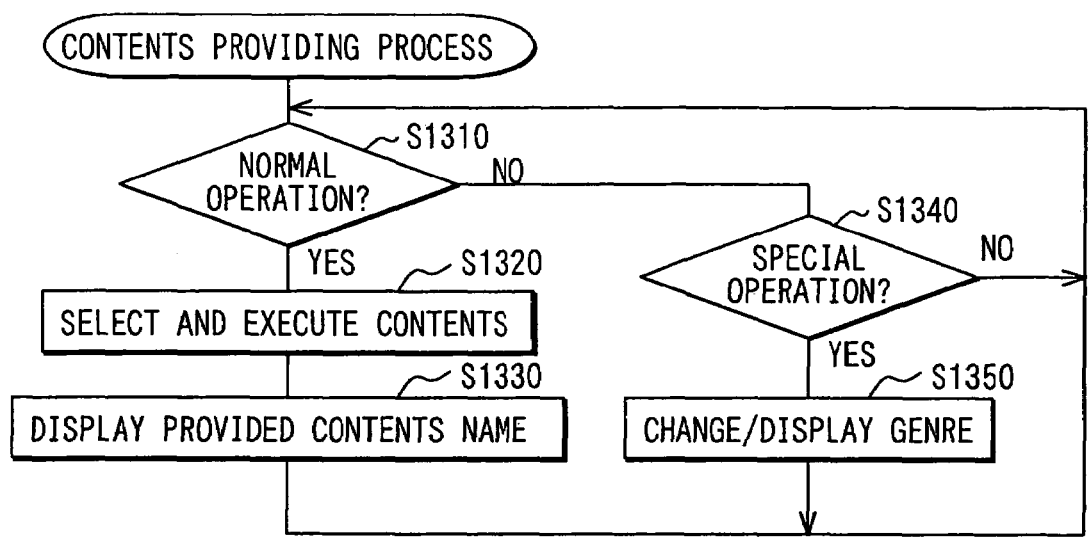
FIG. 8 is a flowchart showing the details of a contents providing process in the second embodiment.

The contents providing process in the embodiment will now be described with the flowchart shown in FIG. 8.

Whether any of the selection keys 41 to 43 is operated in normal operation or not is determined (S1310). When any of the selection keys is operated, processes (S1320 to S1330) similar to the processes in S1220 to S1230 described in the first embodiment are executed and the program returns to S1310.

On the other hand, when the selection keys 41 to 43 are not operated in normal operation, whether any of the selection keys 41 to 43 is operated in special operation or not is determined (S1340). When the selection keys 41 to 43 are not operated in special operation, the program returns to S1310.

When the selection keys 41 to 43 are operated in special operation, a next genre is associated with the operated selection key on the basis of the genre list of the genre orientation to which the genre associated with the operated selection key belongs. Here, the next genre is the highest in the genre recommendation order next to the genre which is presently associated. The name of the associated genre or the label indicative of the genre is displayed in the genre name display part (S1350), and the program returns to S1310.

The normal operation denotes operation of simply depressing the selection keys 41 to 43, and the special operation denotes so-called long-press operation of continuously depressing any of the selection keys 41 to 43 for predetermined time or longer. The special operation is not limited to the long-press operation but may be any operation such as double click which can be easily and reliably distinguished from the normal operation.

In short, when the selection keys 41 to 43 are operated in the normal operation, a contents item is provided and, each time the same selection key is operated, a contents item to be provided is sequentially switched in the same genre. When the selection keys 41 to 43 are operated in the special operation, the genre to be associated with the operated selection key is sequentially switched in the same genre orientation.

By using the interface device 1 of the second embodiment constructed as described above, effects similar to those of the first embodiment are obtained and, moreover, the genre can be switched by manual operation (special operation on the selection keys 41 to 43). Thus, a more flexible interface can be provided.

In the second embodiment, Step S1350 functions as group switching means.

Figure 9A:
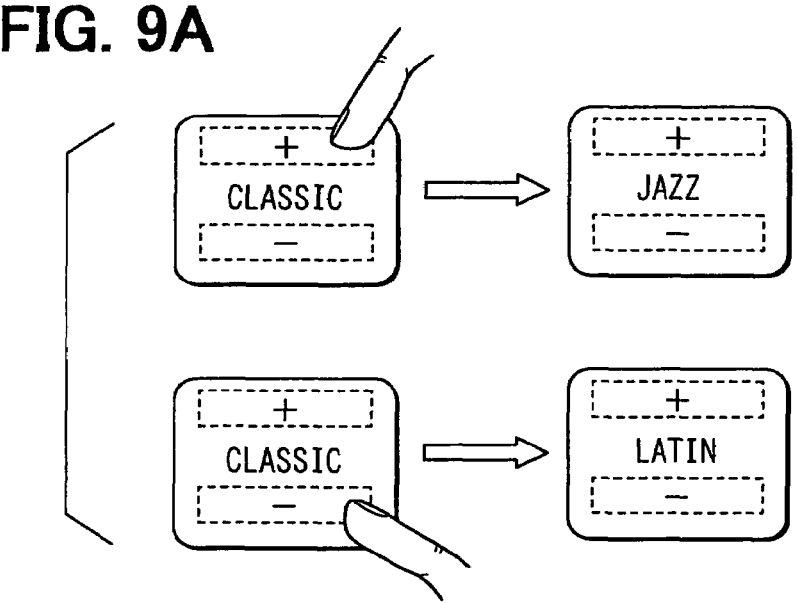
FIGS. 9A and 9B are diagrams illustrating an example of the configuration of selection keys.

The genre can be switched by operating any of the selection keys in the special operation in the second embodiment. Alternatively, for example, as shown in FIG. 9A, a selection key capable of distinguishing among an operation in the case where a center portion of the selection key is depressed, an operation in the case where the upper end ("+" side) is depressed, and an operation in the case where the lower end ("−"side) is depressed may be used, and the operation performed in the case where the upper or lower end is depressed is regarded as the special operation.

In this case, genres can be switched not only in one direction of descending order of the genre recommendation order but also in ascending order.

Figure 9B:
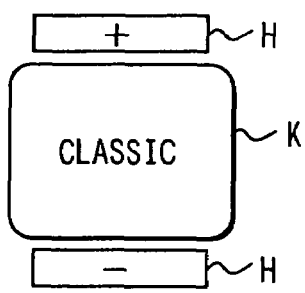

As shown in FIG. 9B, auxiliary keys H may be provided near a selection key K and the genre may be switched by using the auxiliary keys H. Further, a device having a structure such as a jog dial or a volume knob may be used in place of a press button switch as the selection key.

The genre may be switched by using speech recognition in place of operation on the selection key.

Modifications of First and Second Embodiments

Although the embodiments of the invention have been described above, the invention is not limited to the foregoing embodiments and can be variously modified.

For example, in the foregoing embodiments, the inferring process is executed on the basis of the situation data and the user profile. The genre orientation list, genre lists, and contents lists are reconstructed on the basis of the result of inference, so genres to be associated with the selection keys 41 to 43 are selected. In place of executing the inferring process, genres may be selected by using a table lookup method.

Specifically, M situations the user may encounter are preset and each of the situations is expressed as Sm (m=1 to M).

A logic is made so that a result of determination of a situation condition based on the situation data and the user profile corresponds to any of the M situations. It is sufficient to form the top three genres corresponding to each situation Sm in a table as follows.

S0: no designation→(button 1, button 2, button 3)=(news, music, map display)

S1: commutation in the morning→(button 1, button 2, button 3)=(news, traffic information, weather)

S2: shopping on holiday→(button 1, button 2, button 3)= (facility information, event, weather)

S3: outing in fall→(button 1, button 2, button 3)=(map information, traffic information, site information)

By using such a table lockup method, selection of a genre can be realized by a simple process.

To make individual difference reflected, the table has to be customized. When the number M of situations is large, the table size becomes enormous and it also becomes difficult to design the logic of situation determination. Consequently, it is preferable to apply the method to a small-scale system in which the number of variations of the situations is relatively small.

In the embodiment, when the operation on any of the selection keys 41 to 43 is detected in S1210, the processes in S1220 and S1230, that is, a process of providing a contents item of a genre associated with the operated selection key is executed. In the case where a sound input specifying any of the selection keys 41 to 43 or a sound input specifying a genre associated with any of the selection keys 41 to 43 is received via the microphone 8, the processes in S1220 and S1230 may be executed.

Although the genres are associated with the selection keys 41 to 43 in the foregoing embodiment, contents items may be associated with the selection keys 41 to 43. In this case, only a single contents list is stored in the contents list storage 135. In the selection key setting process (refer to FIG. 3), S1160 is omitted. In S1180, it is sufficient to assign the top three contents items in accordance with the contents recommendation order which is set in S1170 to the selection keys 41 to 43.

In the embodiments, the genres or genre orientations are dynamically assigned to all of the selection keys 41 to 43. Alternatively, a part of the selection keys may be fixedly assigned to a specific genre or genre orientation.

Although the dedicated provided contents name display part 154 is provided to show contents items being provided in the embodiment, it may be omitted and the contents items being provided may be displayed on the display 7.

In the embodiment, the selection keys 41 to 43 are realized by push button switches. Alternatively, the selection keys 41 to 43 and the genre name display parts 151 to 153 may be realized as electronic objects on the display.

Figure 10A:
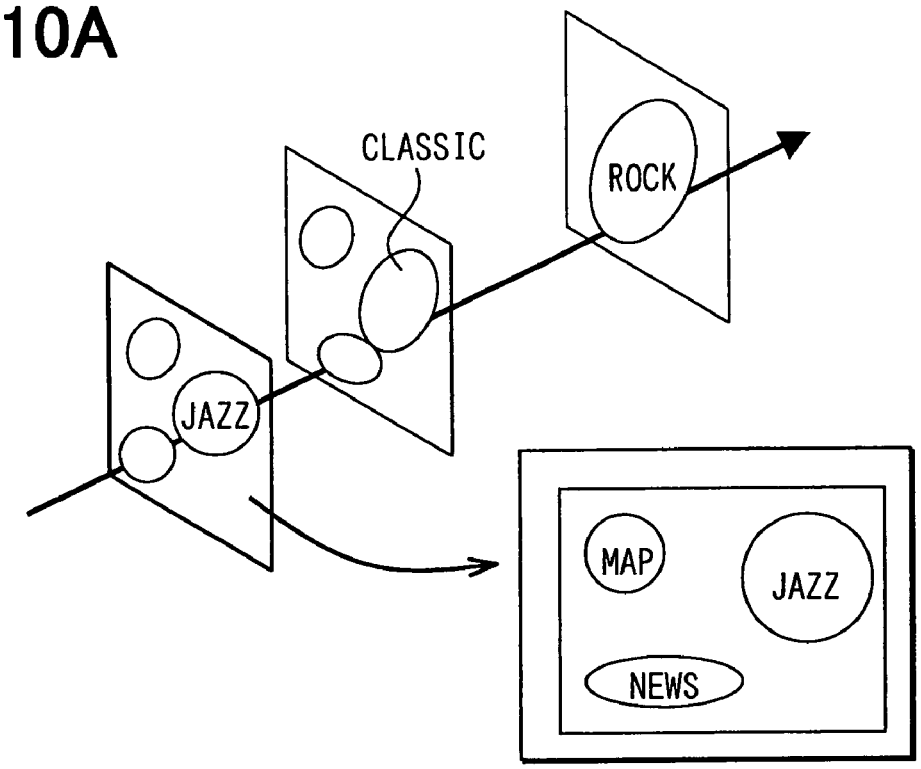
FIGS. 10A and 10B are diagrams illustrating the details of modifications of the first and second embodiments.
Figure 10B:
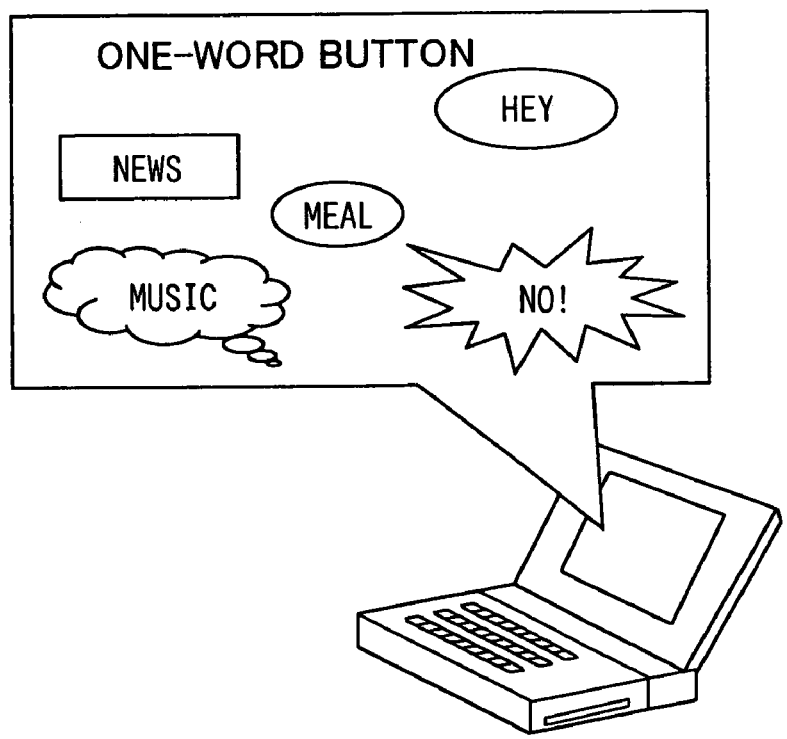

In this case, as shown in FIG. 10A, the display mode (size, position, font, color, and the like) of an electronic object may be varied according to the situation or user, or an electronic object may be moved in a screen for expression of feelings or attraction of attention.

Although the provision of various contents items has been described above, the device of the invention can be also applied to display of vocabularies as user utterance candidates as objects of speech recognition, display of an operation command which seems to be presently necessary, and inference and display of a comment the user wishes to utter (refer to FIG. 10A).

In this case, vocabularies of an extremely small scale, which is necessary for operating the device in this phase, can be dynamically selected according to the situation. Consequently, in cooperation with speech recognition, voice control with little erroneous recognition can be performed.

Third Embodiment

FIG. 11 is a block diagram showing the configuration of an interface device 1 to which the invention is applied. The interface device 1 of the embodiment is mounted in a car (vehicle) to realize provision of various services (such as display of a video image, playback of music, Web search, server connection, and speech recognition) using various devices and the like mounted in the vehicle to an occupant (mainly, the driver) of the vehicle via a simple interface.

As shown in FIG. 11, the interface device 1 of the third embodiment is connected to the following: an input device 3 having selection keys 41 to 43 used to select an application and an operation key group 44 for entering various commands, data, and the like by an external operation; a display device 5 having assigned application display parts 51 to 53 for displaying application names associated with the selection keys 41 to 43 and a provided application display part 54 for displaying the name of an application being provided; a display 7 for displaying an image; and a microphone 8 for inputting voice.

The operation key group 44 includes at least a start key, a correction key, and situation setting keys used for inputting situation data (for example, season, weather, purpose, destination, information, user situations, and the like) used for processes to be described later.

The selection keys 41 to 43 are push button switches formed integrally with the assigned application display parts 51 to 53, respectively and arranged in a lower part of the display 7. The shape, color, and size of each of the selection keys 41 to 43 are designed to be easily recognized and operated by an occupant (particularly, driver) of the vehicle. The operation key group 44 and the provided application display part 54 are disposed near the selection keys 41 to 43.

The interface device 1 is also connected to the following: a known navigation system 11 for performing detection of the present position (present location) of the vehicle, guidance of a route, and the like; an air conditioner 13 for controlling the air condition in the vehicle; an audio/visual device 15 constructed by a cassette tape recorder, a CD (compact disc) player, an MD (mini disc) player, a radio, a video recording/reproducing apparatus, a television, and the like; a communication device 17 for performing data communication by radio between a broadcast terminal of a known VICS (Vehicle Information and Communication System) and an Internet broadcast terminal as a connection port to the Internet; various sensors 19 for detecting a camera image, vehicle operating conditions such as vehicle speed and accelerating/decelerating state, temperatures in the inside/outside of the vehicle, the presence/absence of raindrops, and the like; and other controllers (not shown) for controlling a door lock of the vehicle, a window glass (power window), an engine, a brake device, and the like.

The navigation system 11 includes the following: a known GPS device for detecting the present position of the vehicle; a CD-ROM storing navigation data such as map data, place name data, and facility name data; a CD-ROM drive for reading data from the CD-ROM; and an operation key used by the user to enter a command. For example, when a command requiring a destination and navigation to the destination is input by the operator with an operation key, the navigation system 11 displays a road map including the present position of the vehicle and the optimum route to the destination on the display 7 and performs navigation.

On the display 7, a road map for navigation is displayed by the navigation system 11 and various images such as a menu for information search are also displayed. When the audio/visual device 15 is set in a television mode, a television image received by a television tuner provided for the audio/visual device 15 is also displayed.

The interface device 1 also has: a system controller 21 constructed mainly by a microcomputer including a CPU, a ROM, and a RAM; an input interface (I/F) 23 for inputting a command and data from the input device 3 to the system controller 21; a display controller 25 for controlling display of the parts 51 to 54 constructing the display device 5; a screen controller 27 for controlling a display screen of the display 7; a sound input unit 28 for converting a sound signal which is input from the microphone 8 into digital data and inputting the digital data to the system controller 21; and a device control interface (I/F) 29 for connecting the display 7, the navigation system 11, the air conditioner 13, the audio/visual device 15, the communication device 17, the various sensors 19, and other controllers to the system controller 21 so that data communication can be performed.

The interface device 1 has an Internet address database 31 for storing addresses in the Internet (Internet addresses) to retrieve and obtain desired information from the Internet by the communication device 17 and a search controller 33. When the system controller 21 outputs a search keyword indicative of information to be retrieved to the search controller 33, the search controller 33 operates the communication device 17 via the device control I/F 29 to retrieve information corresponding to the search keyword from an Internet broadcast terminal and input the search result to the system controller 21. In the Internet address database 31, Internet addresses used in the past by the search controller 33 are stored by a command from the system controller 21. When the same search keyword as that input in the past from the system controller 21 is received, the search controller 33 re-uses the Internet address in the Internet address database 31.

The interface device 1 further includes a rule storage 35 and a situation data storage 37. The rule storage 35 stores a rule base 35a in which conditional clauses of inference rules in If-Then statements are described, a scoring vector table (SVT) 35b in which dependent clauses of the inference rules are described, and a situation memory table (SMT) 35c in which a result of inference using the inference rule and operation history of the user are described so as to be associated with each other. The situation data storage 37 stores a situation data file 37a in which situation data indicative of situations of the user, the environment of the user, and the like (for example, natural environment, information environment, information of interest, user situations, and the like) is described; and a user profile 37b in which personal information of a plurality of users is described.

Situation data other than the above-described situation data may be used as long as it exerts an influence on requests and actions of the user. The "natural environment" mentioned as an example of the situation data denotes a season and weather. The "information environment" denotes information of a terminal and a network for obtaining various information (for example, the model of a terminal, ability of a terminal, ability of a network, and the like). The "information of interest" denotes information of important interests for many people such as "a typhoon is approaching," "the World Cup is being held" and the like. The user situations indicate the action (the purpose of the action and destination), physical condition, feeling, and the like of the user at each time.

As the personal information described in the user profile 37b, the preferences of each user are stored so as to be associated with various situations such as time situations (time zone, season, anniversary, and the like), geographical situations, and feeling situations.

The rule base 35a is, as shown in FIGS. 12A and 12B, a table in which rule number is associated with each attribute value of a preset situation attribute or a combination of attribute values. The inference rules are binary such that the conditional clause of the if-then rule can only be either true or false. The inference rule includes a one-dimensional rule in which only one situation attribute is described in a conditional clause, or a hierarchical rule in which a plurality of situation attributes are described. FIG. 12A shows description of the case of the one-dimensional rule, and FIG. 12B shows description of the hierarchical rule.

Examples of the situation attributes are "season," "day of the week," "time zone," "purpose," "destination," and "weather." Each of the situation attributes has a plurality of attribute values indicative of linguistic or numerical conditions for the situation attribute (for example, when the situation attribute is "season," the attribute values are "spring," "summer," "fall," and "winter").

In the rule base 35a, a situation attribute whose importance does not largely change even when combined with the other thing is described mainly in the one-dimensional rule, and a situation attribute whose importance largely changes when combined with the other thing (for example, a situation attribute in which a special case, an exceptional process, or the like is described) is described mainly in the hierarchical rule. Moreover, in the rule base 35a, independence of each rule is assured irrespective of the one-dimensional rule or the hierarchical rule.

Further, in the rule base 35a, a plurality of rule groups grouped based on the functions (corresponding to the dependent clause) and the situations (corresponding to the conditional clause) are stored.

Figure 17:
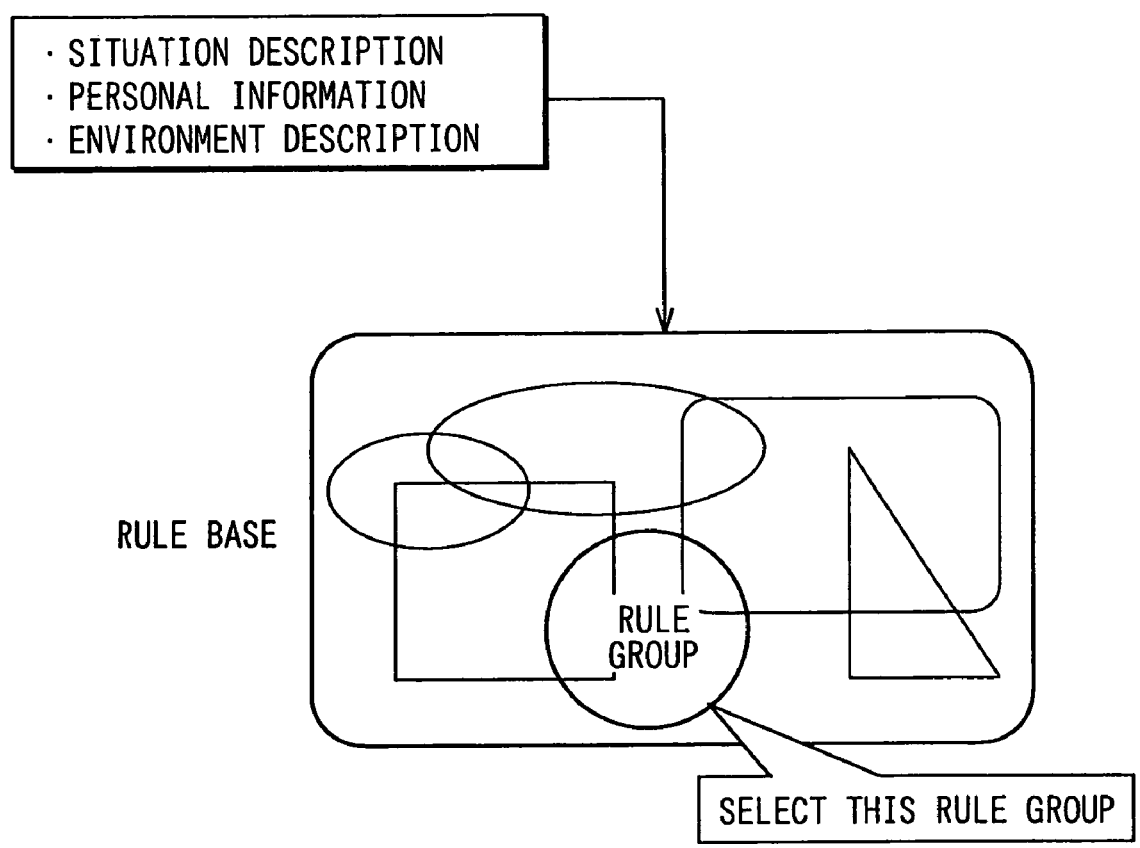
FIG. 17 is a schematic diagram showing the configuration of a rule groups.

Specifically, "rule groups for domestic/U.S.A/China," "rule groups for men/women," "rule groups for children/adults," "rule groups for work/outing," and the like are stored. Each rule group may be constructed so as to share part of rules as shown in a conceptual diagram of FIG. 17.

As shown in FIG. 13A, the SVT 35b is a table in which a scoring vector vi having, as a component, the degree of demand for each of preset demand attributes and a weight factor wi indicative of importance of the scoring vector vi are defined for each rule number Ri specified in the rule base 35a.

As a demand attribute, an expression of desire of the user is used. Examples of the demand attribute are "I want to eat," "I want to play sports," "I want to be relaxed," "I want to refresh myself," "I want to go shopping," "I want to dress up," "I want to talk with someone," "I want to go somewhere," "I want to watch a movie," "I want to listen to music," and "I want to play a game."

In the embodiment, the attribute value (that is, the degree of demand) of the demand attribute is expressed by a numerical value of 0 to 100, and the weighting factor is expressed by a numerical value of 0 to 1.

As the storing vector described in the SVT 35b, initial data is preset from the viewpoint of an average user.

In the embodiment, with respect to the scoring vector in the one-dimensional rule, specifically, attribute values based on subjective judgment of many users are added up by using questionnaire (by using the Internet) or a probe system, the added data is averaged statistically, and the result is set as initial data.

With respect to the scoring vector in the hierarchical rule, data obtained by converting a subjective rule of thumb (representative situations of significant combinations of specific conditions) of a small number of people (system developers or the like) into numeral data is set as initial data.

Since it is difficult to specify all of scoring vectors (corresponding to a rule group describing all of phases or situations many user encounter) constructing the SVT 35b by the set of subjective rules of thumb of a small number of people, the blanks in the SVT 35b are filled by using a method such as inference on the basis of the small number of representative subjective rules of thumb.

Only one SVT 35b commonly used for all of rule groups constructing the rule base 35a may be provided. When the rule groups are grouped by functions, multiple SVTs 35b may be individually used for the rule groups (that is, a plurality of SVTs 35b may be provided). In this case, the kind and the number (dimension of the scoring vector) of the demand attribute associated with each of the components of the scoring vector may vary from one rule group to another.

As shown in FIG. 13B, the situation memory table 35c is a table for storing a demand vector (application vector) to be provided for a selection key setting process which will be described later as a result of the inferring process using the inference rule and feedback information from the user for the setting of the selection keys 41 to 43 based on the demand vector (such as an application selecting operation, an operation of changing setting of the selection keys 41 to 43, and the like) so as to be associated with date and time at which the feedback information is obtained.

Each of the rule storage 35, situation data storage 37, and Internet address database 31 is constructed by a data readable/writable nonvolatile memory.

Figure 14:
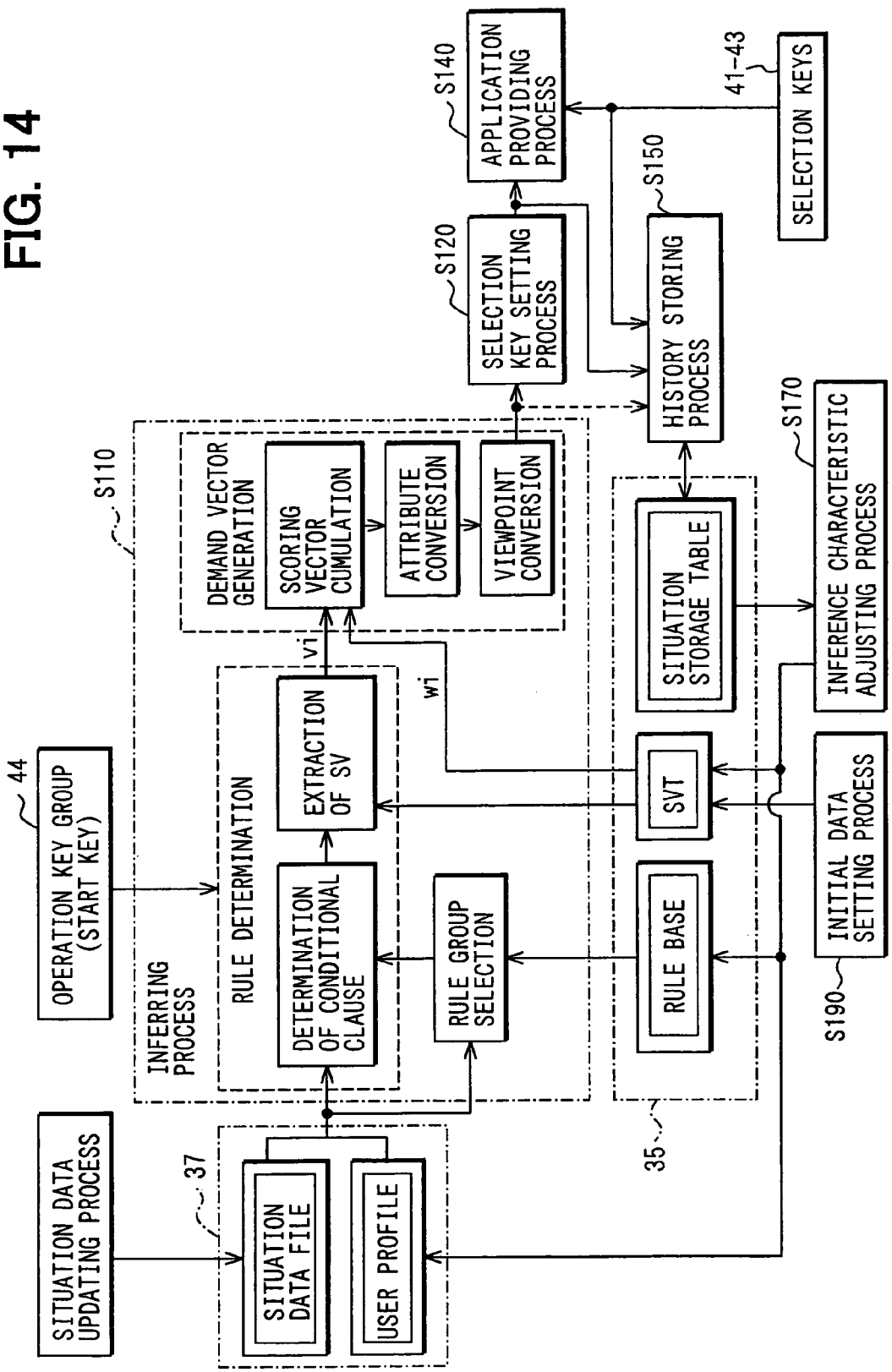
FIG. 14 is a functional block diagram showing the interface device.

An outline of main processes executed by the system controller 21 in the interface device 1 constructed as described above will now be described with reference to the functional block diagram of FIG. 14 and the flowcharts shown in FIGS. 15 and 16.

The CPU as a component of the system controller 21 executes not only the main process but also a situation data updating process of updating data in the situation data file 37a with information collected by the communication device 17 and the various sensors 19.

In the ROM as a component of the system controller 21, in addition to the program for executing the main process and the situation data updating process, various application programs for executing a process necessary in the application providing process executed in the main process and a control of the device group (for example, a video display application, a music playback application, a Web search application, a server connection application, and a sound recognition application) are stored.

Figure 15:
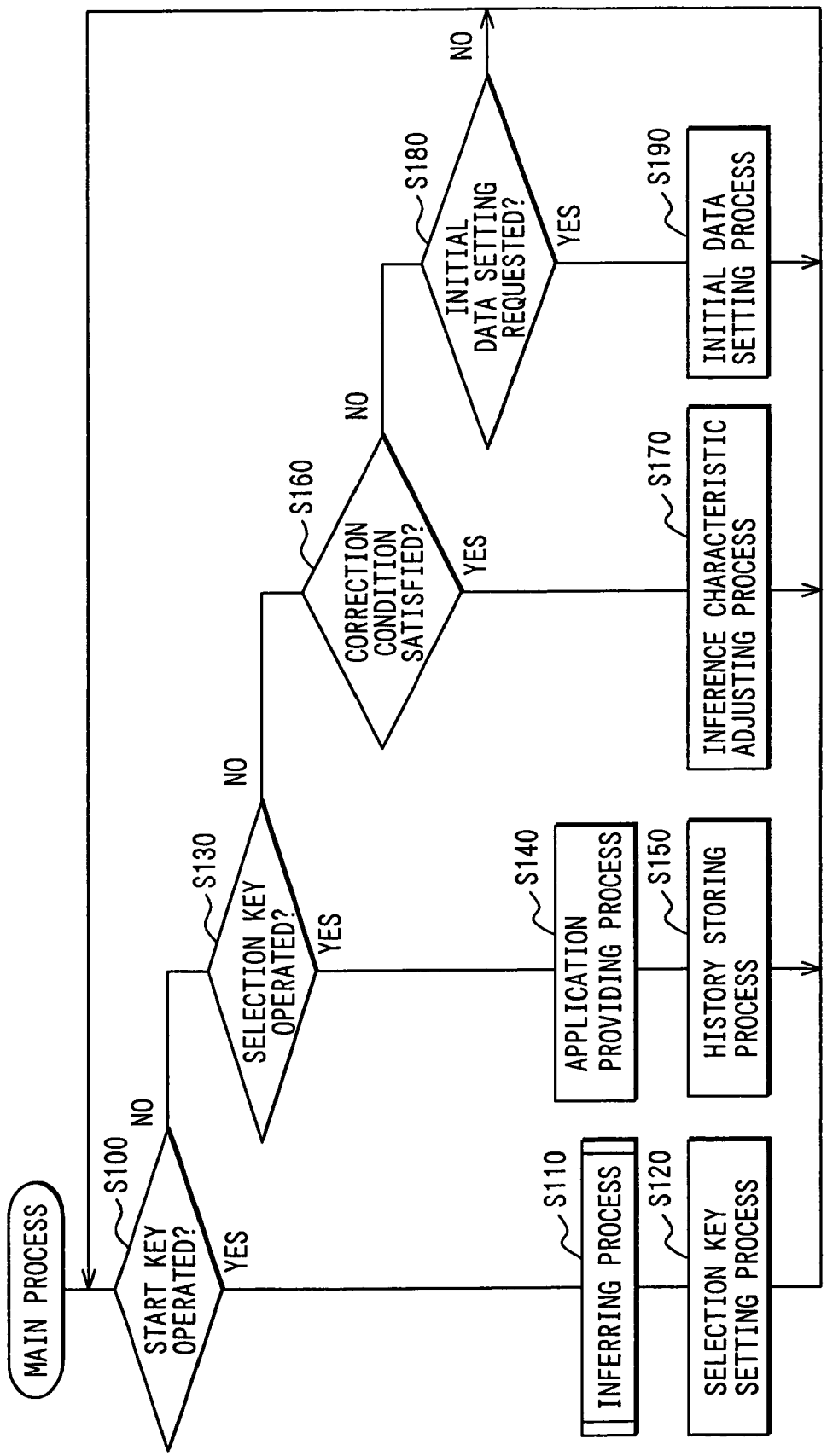
FIG. 15 is a flowchart showing the details of a main process executed by a system controller.

As shown in FIG. 15, when the main process starts, whether a start key as one of the operation key group 44 is operated or not is determined (S100). When the start key is operated, the inferring process of inferring a demand of the user is executed (S110).

Figure 16:
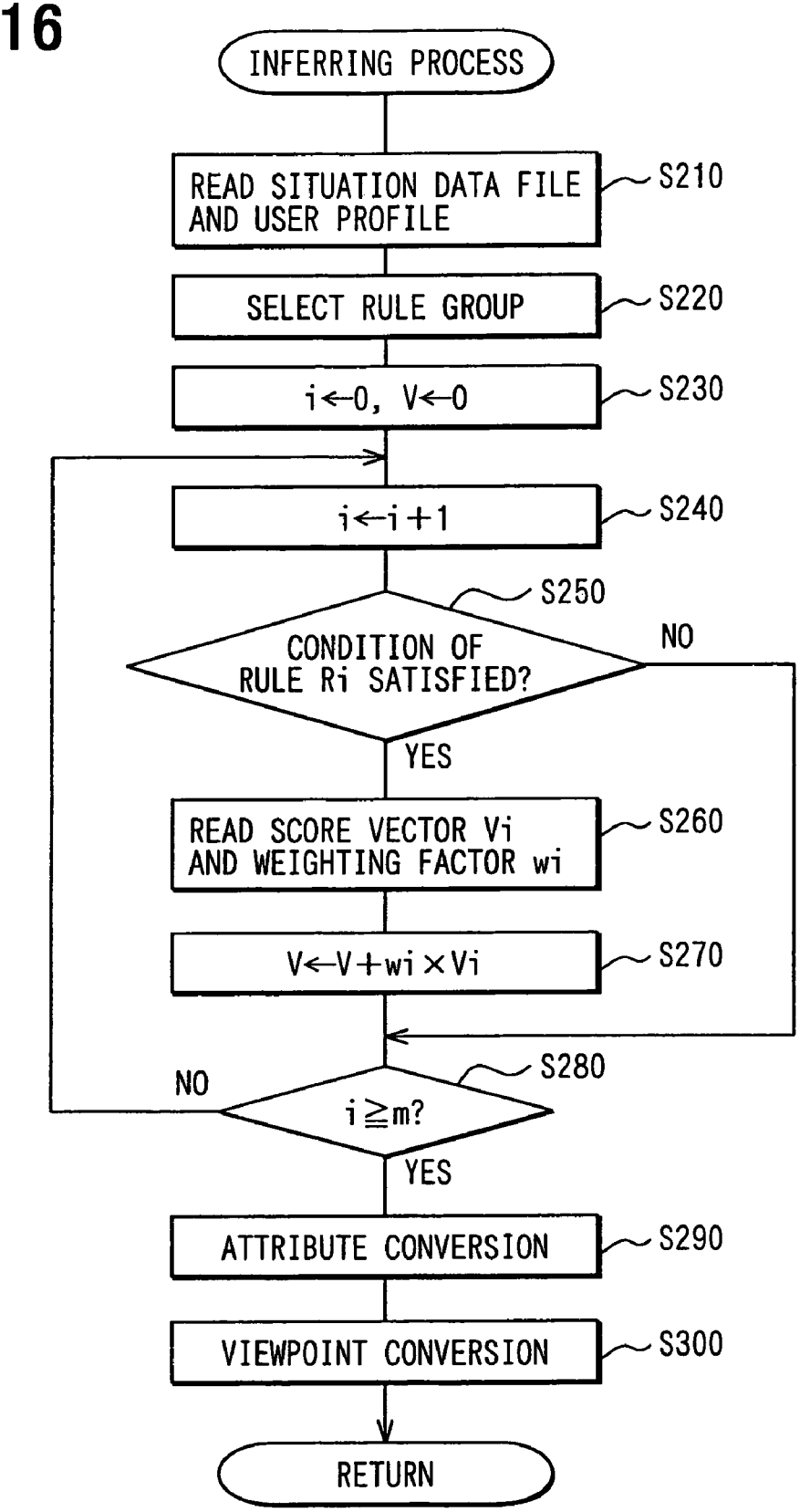
FIG. 16 is a flowchart showing the details of an inferring process.

In the inferring process, as shown in FIG. 16, the situation data file 37a and the user profile 37b are read from the situation data storage 37 (S210). On the basis of the read files, a rule group to be used at the present time point is selected from the rule base 35a in the rule storage 35 (S220). At this time, the total number of rules belonging to the selected rule group is set as "m" and, in the following, the rules will be expressed as R1 to Rm.

A parameter "i" used for identifying a rule is initialized to zero. On the basis of an SVT corresponding to a selected rule group, a demand vector V of the same N dimensions (the same number of components) as that of a scoring vector described in the SVT is set. The value of each of the components of the demand vector V is initialized to zero (S230).

After that, the parameter "i" is incremented (S240) and, on the basis of a present situation specified from the data read in S210, whether the condition described in the conditional clause of the rule Ri is satisfied or not is determined (S250).

When the condition described in the conditional clause of the rule Ri is satisfied, a scoring vector vi and a weighting factor wi of the rule Ri are read from the SVT 35b (S260). As shown by Expression (3), a value obtained by multiplying the scoring vector vi with the weighting factor wi is added to the demand vector V, thereby updating the demand vector V (S270), and the program advances to S280.

$$V \leftarrow V + wi * Vi \qquad (3)$$

On the other hand, when it is determined in S250 that the condition described in the conditional clause of the rule Ri is not satisfied, without executing S260 and S270, the program advances to S280 where whether the parameter "i" is equal to or larger than the total number "m" of rules ($i \geq m$) is determined (S280). When ($i \geq m$) is not satisfied, it is regarded that an unprocessed rule exists in the selected rule group, and the program returns to S240 and repeats the above-described processes (S240 to S270).

When ($i \geq m$) is satisfied, it is regarded that the above-described processes have been finished on all of the rules belonging to the selected rule group, and an attribute converting process of converting a demand attributes associated with the components of the demand vector V from a user's demand to an application is executed (S290). Further, a viewpoint converting process of converting a demand vector (application vector) Va subjected to the attribute converting process to a demand vector (application vector) Vb in which the viewpoint of the user is reflected on the basis of the user profile 37b read in S210 is executed (S300), and the inferring process is finished.

In short, by repeating the processes of S240 to S270, storing vectors of all of rules which are hit (whose condition is satisfied) are subjected to weighting and addition. As a result, the demand vector V is obtained.

Figure 18:
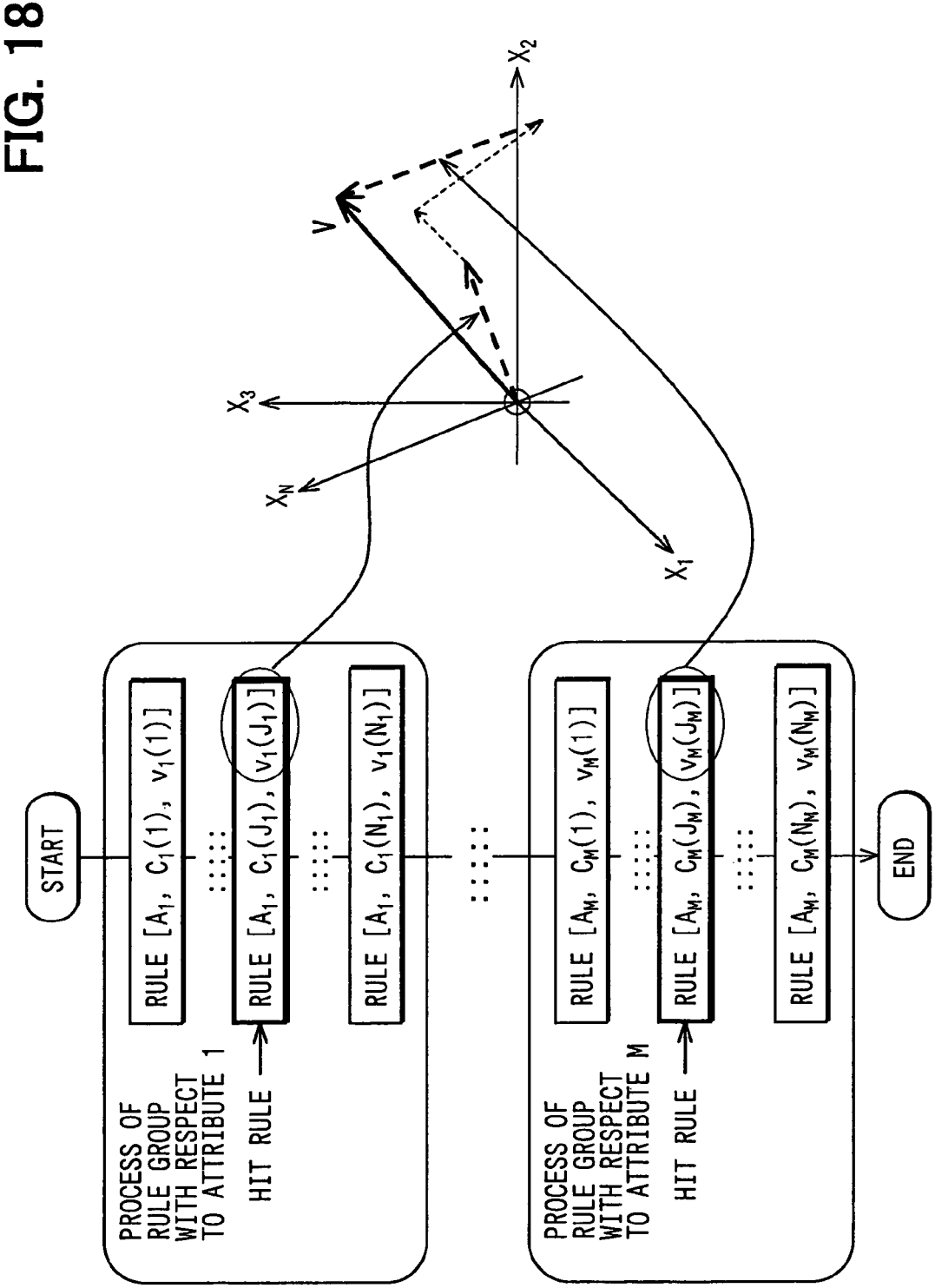
FIG. 18 is a diagram illustrating an outline of a scoring vector cumulative process.

FIG. 18 is a diagram schematically illustrating the process and shows the case where the selected rule group is constructed only by one-dimensional rules of M situation attributes $A_1$ to $A_M$.

A one-dimensional rule in which only the condition of the situation attribute Ai is described in the conditional clause is expressed as (4).

$$\text{Rule } [A_i, C_i(J_i), v_i(J_i)] \quad (4)$$

Figure 19:
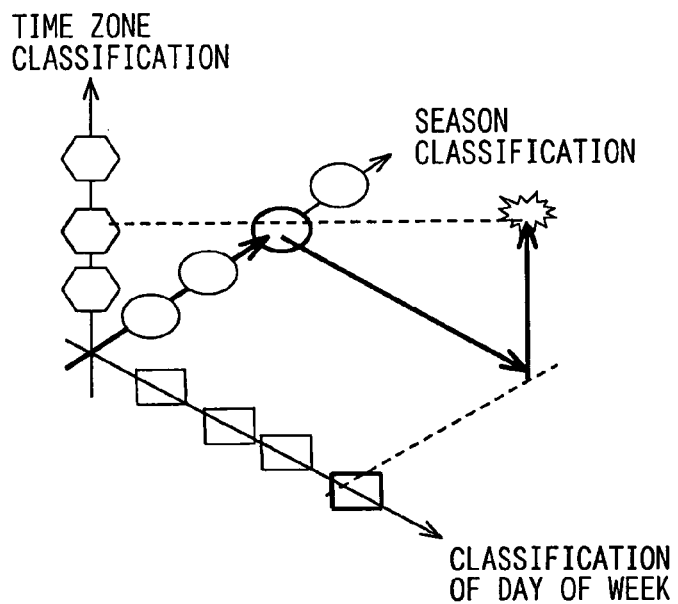
FIG. 19 is a diagram showing a specific example of the cumulative process.

$C_i(J_i)$: the conditional clause of the $J_i$-th rule in the rule group of $A_i$ $v_i(J_i)$: the scoring vector obtained when $C_i(J_i)$ is satisfied Specifically, none or one rule is selected from each of partial rule groups of each situation attribute $A_i$, and the scoring vector of the N dimensions corresponding to the selected rule is overlaid on an N-dimensional coordinate system in which coordinate axes $X_1$ to $X_N$ correspond to the situation attributes, thereby obtaining the demand vector V. FIG. 19 illustrates a more specific case where "time zone," "season," and "day of the week" are used as the situation attributes.

In the attribute converting process of S290, the demand vector V whose components (demand attributes) are associated with the degrees of N kinds of demands of the user is converted to the demand vector (hereinbelow, also called as "application vector") Va whose components (demand attributes) are associated with the degrees of demands for L kinds of applications (contents items).

Examples of the demand attributes of the application vector Va are "news," "road information," "weather information," "nearest facility information," "map display," and "quiet music."

Figure 20:
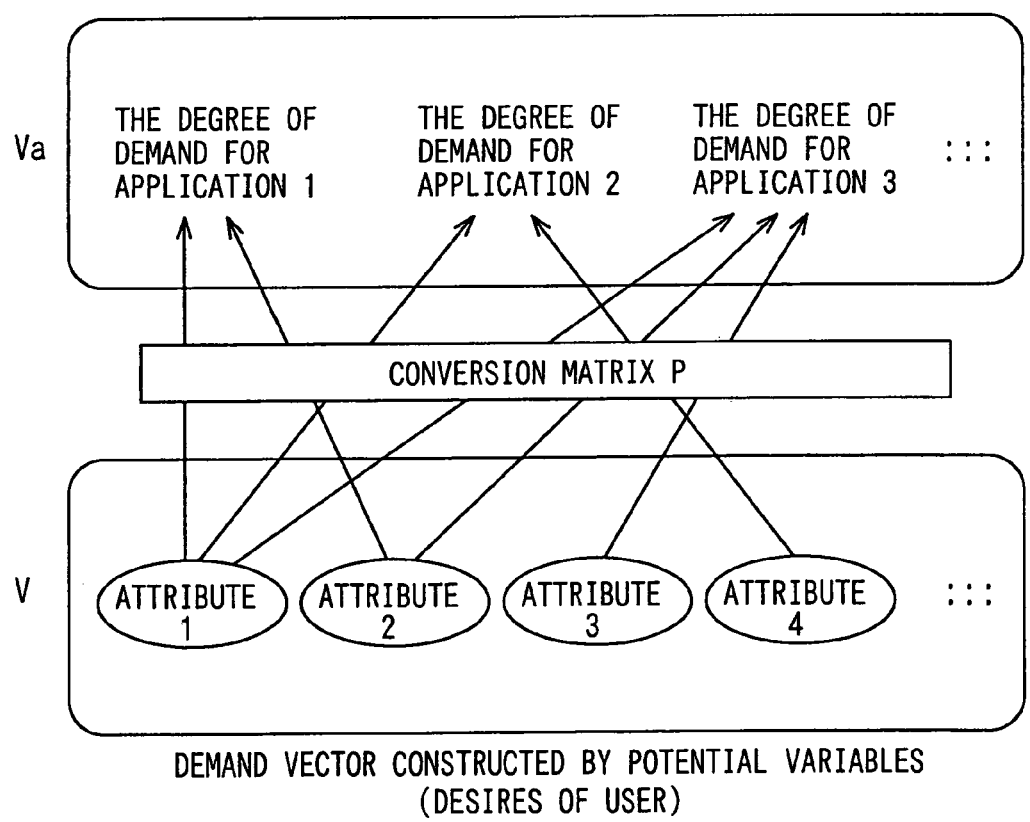
FIG. 20 is a diagram showing the details of an attribute converting process.
Figure 21:
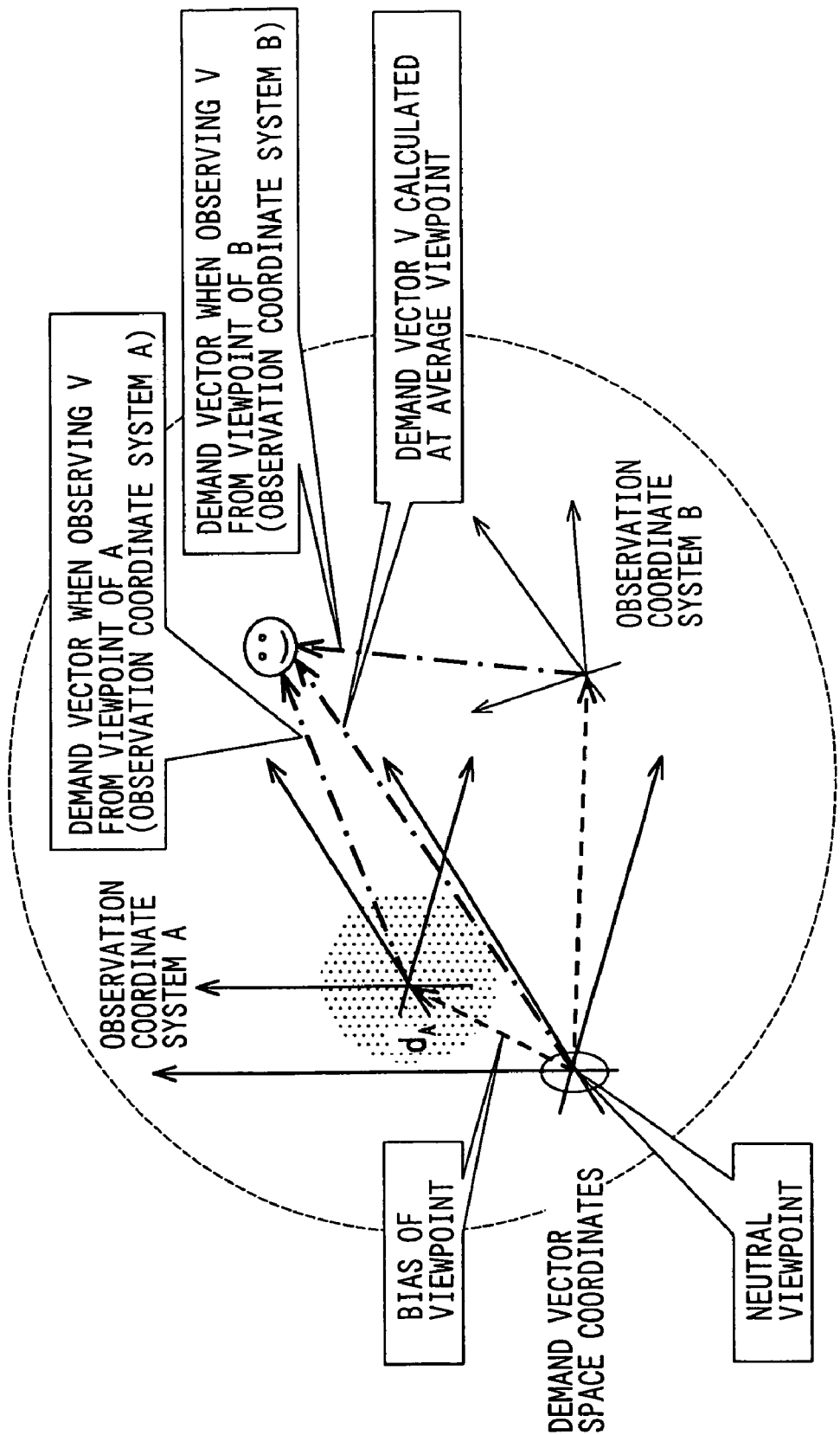
FIG. 21 is a diagram showing the details of a viewpoint converting process.

Specifically, the application vector Va is calculated by performing vector computation shown in (5) on the demand vector V obtained by the cumulative (weighting and addition) process (refer to FIG. 20).

$$Va = PV + f \quad (5)$$

P: conversion matrix of L×N dimensions for converting N-dimensional vector to L-dimensional vector f: L-dimensional constant vector corresponding to statistic average of application vectors Va The conversion matrix P can be obtained from past statistic data by using, for example, covariance structure analysis. The covariance structure analysis is a known method and is not related to the main part of the invention so that it will not be described here.

In the viewpoint converting process of S300, it can be regarded that the application vector Va is expressed by using a common coordinate system O corresponding to the neutral viewpoint of a user. By converting it into a personal coordinate system corresponding to the personal viewpoint of the user, viewpoint conversion is realized.

Specifically, the coordinate conversion corresponding to the personal viewpoint is realized by performing vector computation of Equation (6) using a coordinate conversion matrix $R_A$ of L×L dimensions and a translation vector $d_A$ of L dimensions.

$$Vp = R_A(Va - d_A) \quad (6)$$

It is sufficient to preset the coordinate conversion matrix $R_A$ and the translation vector $d_A$ as data of the user profile 37b.

For example, in the case of setting the coordinate conversion matrix $R_A$ as a unit matrix I for simplicity, Equation (6) is expressed by the following equation (7).

$$Vp = Va - d_A \quad (7)$$

Further, the case where the application vector Va of two dimensions (L=2) is used, demand attributes are "news" and "playback of jazz music," the application vector Va is expressed by the following equation (8), and the translation vector $d_A$ is expressed by the following equation (9) will be considered.

$$Va = (\text{degree of demand for news, degree of demand for playback of jazz music})^t = (100, 80)^t \quad (8)$$

$$d_A = (30, -10)^t \quad (9)$$

The application vector Vp after coordinate conversion calculated on the basis of Equations (7) to (9) is expressed by the following equation (10).

$$Vp = (70, 90)^t \quad (10)$$

Specifically, even when the "degree of demand for news" in a certain situation is inferred as 100 for the average user, it is 70 for a user A (from the viewpoint of the user A). The user A does not demand for news as much as the average user. On the other hand, the "degree of demand for playback of jazz music" which is inferred as 80 for the average user is 90 for the user A. Consequently, the degree of demand for news in the application of the average user is higher than that of the user A, and the degree of demand for playback of jazz music of the average user is lower than that of the user A.

Referring again to FIG. 15, after the inferring process (S110), based on the application vector Vp obtained as the result of inference, the selection key setting process is executed (S120) and the program returns to S100.

In the selection key setting process, first, an application list in which application names associated with the components of the application vector Vp are arranged in descending order of the component values, that is, in descending order of the degree of demand of the user (hereinbelow, called "application recommendation order") is generated. The top three applications in the application list are associated with the selection keys 41 to 43, and the name of the associated applications or labels indicative of the applications are displayed in the assigned application display parts 51 to 53.

In short, when the start key is operated, the top three applications estimated to be demanded by the user are selected and assigned to the selection keys 41 to 43. In other words, the interface device 1 recommends applications according to the situation to the user.

In the case where it is determined in S100 that the start key is not operated, whether the selection keys 41 to 43 are operated or not is determined (S130). When any of the selection keys 41 to 43 is operated, an application providing process of providing an application associated with the operated selection key by using various devices and sensors connected via the device control I/F 29 is executed (S140). Further, a history storing process of storing feedback information and an inference result (the application vector Vp or Va or the demand vector V) of the inferring process of S110 is executed for the feedback information and the inference result to be associated with each other in the situation memory table 35c (S150). The feedback information is indicative of the operation (response) of the user that triggers the application providing process. The program then returns to S100.

In the application providing process of S140, not only provision of an application but also a process of displaying the name of the application being provided or the label indicative of the application on the provided application display part 54 are executed. When a special operation (for example, long press) is performed on the selection key, a process of changing the association of the application to the operated selection key, and the like is also executed according to the application list generated in S120.

In the history storing process of S150, when an application is provided in response to the operation performed on any of the selection keys 41 to 43 in the application providing process, the provided application is used as feedback information. When the application to be associated with any of the selection keys 41 to 43 is changed, the change is used as feedback information.

The data (hereinbelow, called "operation data") in the situation memory table 35c stored by the history storing process is transmitted to an external information collecting center via the communication device 17 by a communication process separately started.

In this case, when any of the selection keys 41 to 43 is operated, the application assigned to the operated selection key is driven. In the case where applications are assigned to the selection keys 41 to 43 and the selection keys 41 to 43 are not operated immediately after that or for preset wait time or longer, the application at the top in the application recommendation order may be automatically provided. Also in the case where an application is automatically provided, information indicative of no negative response from the user (that is, the user sent back a positive response) is stored as feedback information in the situation memory table 35c.

In the case where it is determined in S130 that any of the selection keys 41 to 43 is not operated, whether a preset correction condition is satisfied or not is determined (S160). When the condition is not satisfied, the program returns to S100. When the condition is satisfied, an inference characteristic adjusting process of correcting an inference characteristic in the inferring process of S110 is executed (S170) and the program returns to S100.

The correction condition is determined as satisfied in S180 in any of the following cases (A) to (D).

(A) The case where the difference (in size, angle, or the like) between an application vector Va (that is, an estimated demand) stored in the situation memory table 35c in the history storing process of S150 and an operation vector (that is, an actual demand) generated on the basis of feedback information is equal to or larger than a preset threshold.

(B) The case where the condition shown in the case (A) is clearly satisfied when a statistical determination is made on the basis of operation data (application vector and feedback information) in a past predetermined period or longer stored in the situation memory table 35c.

(C) The case where the user inputs a request for correcting the inference characteristic with the operation key group 44.

(D) The case where there is no negative reaction of the user (that is, an operation of changing an assigned application is not performed) to a setting made by the selection key setting process.

In the inference characteristic adjusting process of S170, when the correction condition of (A) or (B) is satisfied, the inference characteristic of the part related to generation of the application vector Va is corrected so that the difference between the application vector and the operation vector is reduced.

In this case, specifically, the following (a) to (f) are to be corrected.

(a) the value of a scoring vector (b) description of the rule base (addition or subdivision of the conditional clause)

(c) a parameter (weighting factor wi) used for the cumulative process (d) conversion matrix P and constant vector f used for the attribute converting process (e) the coordinate conversion matrix $R_A$ and translation vector $d_A$ used for the viewpoint converting process (f) description of the user profile used for determining the conditional clause In the case where the correction condition of (C) is satisfied, an operation data group collected by another device is obtained by communication with an information collecting center via the communication device 17. By using the obtained operation data group or the operation data group stored in the situation memory table 35c, a new rule extracted by performing a statistical process on the operation data group is added to the rule base 35a or the SVT 35b.

In the case where the correction condition of (D) is satisfied, the inference characteristic (particularly, each rule) of the part related to generation of the application vector Va provided for the selection key setting process is enhanced. In this case, (a) and (c) are to be enhanced. In the case where neighborhood of a rule to be enhanced (center rule) can be defined, a rule belonging to the neighborhood (neighbor rule) is also enhanced.

With respect to the neighbor rule, a value obtained by multiplying an increment in the center rule with a coefficient value (0 to 1) is used as an increment of the value to be enhanced so that the increment of the value to be enhanced does not exceed that in the center rule. For instance, a rule included in the neighborhood has an attribute value belonging to the same category as the attribute value of the center rule, with respect to the situation attribute described in a conditional clause.

In the case where it is determined in S160 that the correction condition is not satisfied, whether the demand for setting initial data of the SVT 35b is input with the operation key group 44 or not is determined (S180). When the demand is input, an initial data setting process is executed (S190) and the program returns to S110.

In the initial data setting process of S190, either the following (i) or (ii) is executed.

(i) Data which is input by an operation on the operation key group 44 is stored as initial data into the SVT 35b. The operation on the operation key group 44 may be an operation of setting each data piece or an operation of setting a plurality of pieces of data in a lump by selecting them from a preset template group. At the time of inputting the data, it is desirable to use a prepared interactive assisting tool.

(ii) Data generated by performing the inferring process on the basis of the description in the user profile 37b is stored as initial data in the SVT 35b. The method is suitable for generating an SVT of a new user in a state where the rule base 35a has been already used by many users, in a system of setting an SVT for each user without performing the viewpoint conversion of S310. The method also corresponds to adaptive selection of a rule.

Further, in the initial data setting process, since an enormous work amount is necessary to set a scoring vector for each of all of the rules described in the rule base 35a (all of items in the SVT 35*b*) by the above-described method, the following transferring process is executed.

In the case where the attribute values of a certain situation attribute can be classified into some categories, a partial rule group constructed by rules whose attribute values of the situation attribute belong to the same category is regarded to have the same initial data. When a scoring vector is set for any of rules belonging to the partial rule group, the same scoring vector is transferred to the other rules belonging to the partial rule group.

Specifically, when the situation attribute is "destination," "outing place" exists as one of categories of the destination. The "outing place" category includes "park," "garden," "amusement park," "resort," "hot spring," and the like. When description of the situation attribute "destination" exists in the conditional clause of a rule X and a rule Y, the description is "park" in the rule X and is "hot spring" in the rule Y, and the description of the other situation attributes can be regarded as equivalent, the same value is set as initial data of the scoring vectors of the rules X and Y. In a sense, it corresponds to execution of inference.

As described above, in the interface device 1 of the embodiment, a plurality of rules are allowed to be hit with respect to a certain situation setting in the inferring process and, moreover, scoring vectors of all of the hit rules are cumulated, thereby generating a demand vector necessary to obtain an inference result.

Therefore, in the interface device 1 of the embodiment, even when a plurality of rules are hit, local optimization does not occur but an optimum inference result based on the whole hit rules can be obtained.

Since a plurality of rule groups are used for the inferring process and, moreover, description of the conditional clauses is independent on the rule group unit basis in the embodiment, as compared with the conventional device in which all of situation attributes are included in the conditional clauses, the number of rules to be set can be largely reduced. Moreover, additional correction of a rule and dynamic optimization to an individual or a situation can be facilitated.

In the embodiment, by describing a dependent clause of a rule by using a scoring vector, a characteristic of a determination result can be expressed while leaving ambiguity in a dependent clause in each rule and, in addition, rules corresponding to an exception and a special case can be easily added. Such a rule may be added as a one-dimensional rule or a conditional branch in a hierarchical rule. The addition corresponds to addition of a demand vector of the difference under a certain condition with respect to a demand vector value of a basic case.

In the embodiment, a rule group according to a situation is selected from a plurality of rule groups and used. Since only a necessary rule group is restrictively used, the inferring process can be executed adaptively and efficiently (at high speed).

In the embodiment, a demand attribute used for a scoring vector is set as a desire of the user, scoring vectors are cumulated and, after that, the attribute converting process is executed, thereby converting the demand attribute of the demand vector V from the desire of the user to an application. Consequently, in the case where an application which can be driven is subjected to addition, change, or deletion, without changing the scoring vectors, the device can easily handle the addition, change, or deletion only by changing the conversion matrix P used for attribute conversion.

In the embodiment, the attribute value of a demand attribute of a scoring vector is set on the basis of an average user. After the attribute change process, the viewpoint converting process is performed, thereby making a personal viewpoint of the user reflected in an application vector.

Therefore, it is unnecessary to make the characteristic (viewpoint) of each user reflected in a rule group (particularly, scoring vector) itself, and the same rule group can be applied to all of the users, so that the scale of the rule base 35*a* and the SVT 35*b* can be minimized.

In the embodiment, at the time of the initial data setting process, a scoring vector is not set in each of all of the rules. In rules having attribute values belonging to the same category in a certain situation attribute, the same scoring vector is set by the transferring process. Thus, the process amount of the initial data setting process can be largely reduced.

In the embodiment, the inference characteristic is corrected or enhanced on the basis of a result of inference or feedback information from the user, so that adaptation according to an individual or a situation can be dynamically performed.

In the embodiment, a hierarchical rule is determined with priority on description of the purpose or destination base, so that a rule can be efficiently described for the reason that, at the time of inferring a user demand, information of the description of the purpose and destination is dominant. Particularly, by effectively utilizing the description of a destination, the description of the purpose can be prevented from being directly remained in a terminal and a network. Consequently, it is preferable also from the viewpoint of privacy protection.

In the initial data setting process, to realize the above-described process (i), a template group of initial data has to be prepared. To generate and edit a temperate group, it is desirable to visually express a rule group on a display. In this case, the following expressing method can be employed.

Specifically, two of situation attributes are associated with a two-dimensional address for specifying each of tile images which are arranged two-dimensionally, and three of demand attributes are associated with three primary colors expressing colors of a tile image.

Figure 23A:
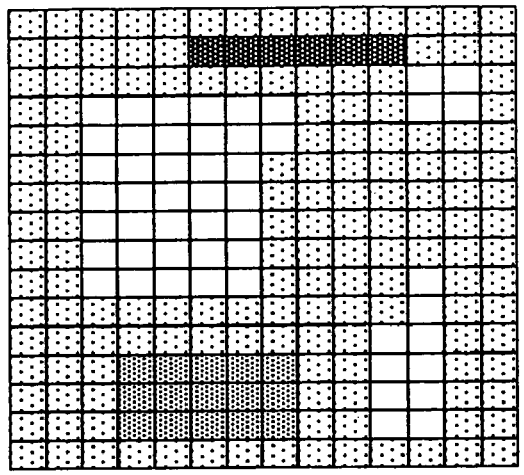
FIGS. 23A and 23B are diagrams showing a method of visually expressing a rule group.

By using the expressing method in such a manner, as shown in FIG. 23A, a system designer and the user can visually grasp the characteristics (such as periodicity of a scoring vector and space dependency) of a rule group from a distribution of colors of a tile image. Specifically, macro characteristics of a user, similarities between different users, and statistical characteristics common to many users can be also visually grasped.

Figure 23B:
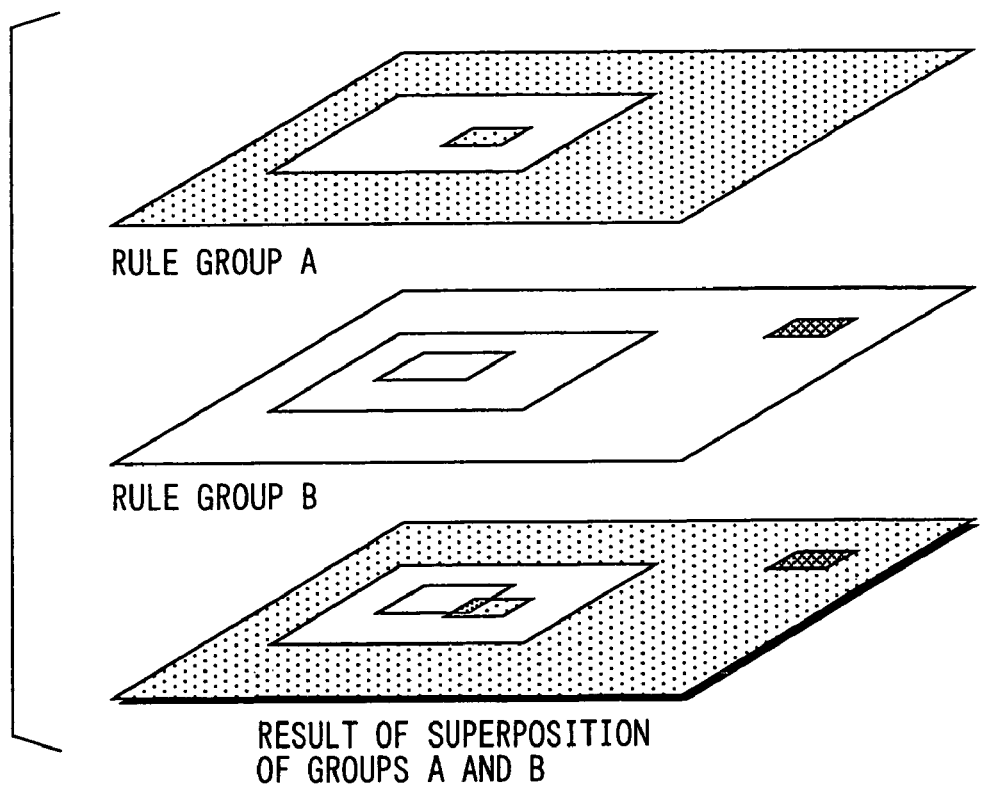

By visualizing the characteristics of the rule group, editing and processing (such as transfer of a rule in the same user or between different users) on a rule group can be easily performed by using a known image processing method which is executed on a display. In other words, by introducing a scoring vector into description of a rule, a linear weighted sum process among rules can be easily performed. Consequently, such editing and processing and, particularly, superposition of rule groups as shown in FIG. 23B can be performed.

Further, by introducing a vector space and image expression into expression of a rule group, updating of history of rule groups, and retrieval and recognition of a rule (group) having a specific pattern can be easily performed.

Alternatively, two conditions which are dominant in rule designing among situation attributes are made correspond to a two-dimensional address for specifying an image tile. Each image tile is constructed by a plurality of partial image tiles and the remaining situation attributes are made correspond to relative addresses for specifying the partial image tiles. In this case, a larger number of situation attributes can be reflected in a single image expressing a characteristic of a rule group.

In the embodiment, the rule base 35a and the SVT 35b function as rule storing means, the situation memory table 35c functions as history storing means, S230 to S280 function as scoring vector extracting means and demand vector generating means, S120 functions as inference result generating means, S290 functions as attribute converting means, S300 functions as viewpoint converting means, S190 functions as initial data setting means and initial data transferring means, S170 functions as inference characteristic correcting means and rule enhancing means, and S150 functions as response detecting means.

The third embodiment of the invention has been described above. The invention is not limited to the foregoing embodiment but can be variously modified.

For example, in the foregoing embodiment, by setting a conditional clause in description of a purpose or destination in an upper position of a hierarchical rule, rules can be described efficiently. Also in the case of describing them as a one-dimensional rule, similar effects can be obtained. For example, when one attribute in destination description such as {restaurant, post office, bank, office, . . . } is defined, a sufficient effect can be displayed in information retrieval or navigation. Description of time by paying attention to seasons is one of examples which combine multiple attributes to enable a rule to be efficiently described.

In the foregoing embodiment, by performing attribute conversion or viewpoint conversion on a demand vector V obtained by cumulating scoring vectors, adaptation to each user is realized. Alternatively, by also performing adjustment of the SVT 35b (dynamic rewrite of a scoring vector) when selecting the rule group based on the read situation data file and the read user profile (S220), adaptation to each user may be performed.

In the foregoing embodiment, by setting a demand attribute used for a scoring vector to a desire of the user and performing the attribute converting process (S290) after cumulation of the scoring vectors, the demand attribute used for the demand vector V is converted to an application. It is also possible to initially set a demand attribute used for a scoring vector and omit the attribute converting process (S290).

In the foregoing embodiment, after the attribute conversion, the viewpoint conversion is performed. On the contrary, after the viewpoint conversion, the attribute conversion may be performed.

Although the coordinate conversion is applied to the conversion of the viewpoint of each user in the foregoing embodiment, the invention is not limited to the embodiment but may be applied to a dynamic situation in the same user. To be specific, since the viewpoint changes according to various situations in the same user, the same model as that in the case of viewpoint conversion can be used.

In the foregoing embodiment, the SVT 35b which is set on the basis of the viewpoint of the average user is used. Alternatively, at the time of selecting a rule group (S220), the set value (initial data) of the SVT 35b may be changed so as to be adapted to a present situation and the user in accordance with the situation data and the user profile obtained in S210. Since the process is equivalent to the viewpoint converting process of S300, in this case, the viewpoint converting process of S300 may be omitted.

In the foregoing embodiment, an inference rule is described by using the rule base 35a and the SVT 35b. Without using a table, an inference rule may be described in a programming language. In this case, a conditional clause is described in hierarchy by nesting using If statements.

In the foregoing embodiment, as the process of cumulating scoring vectors, weighting addition is executed. Alternatively, other cumulating processes may be performed and the computation may be linear or nonlinear. In the foregoing embodiment, each time a rule which is hit is detected, a scoring vector corresponding to the rule is sequentially cumulated. It is also possible to temporarily store a scoring vector of a hit rule into a vector list and, after all of scoring vectors are extracted, perform setting of a weighting factor and an cumulating process.

Figure 22:
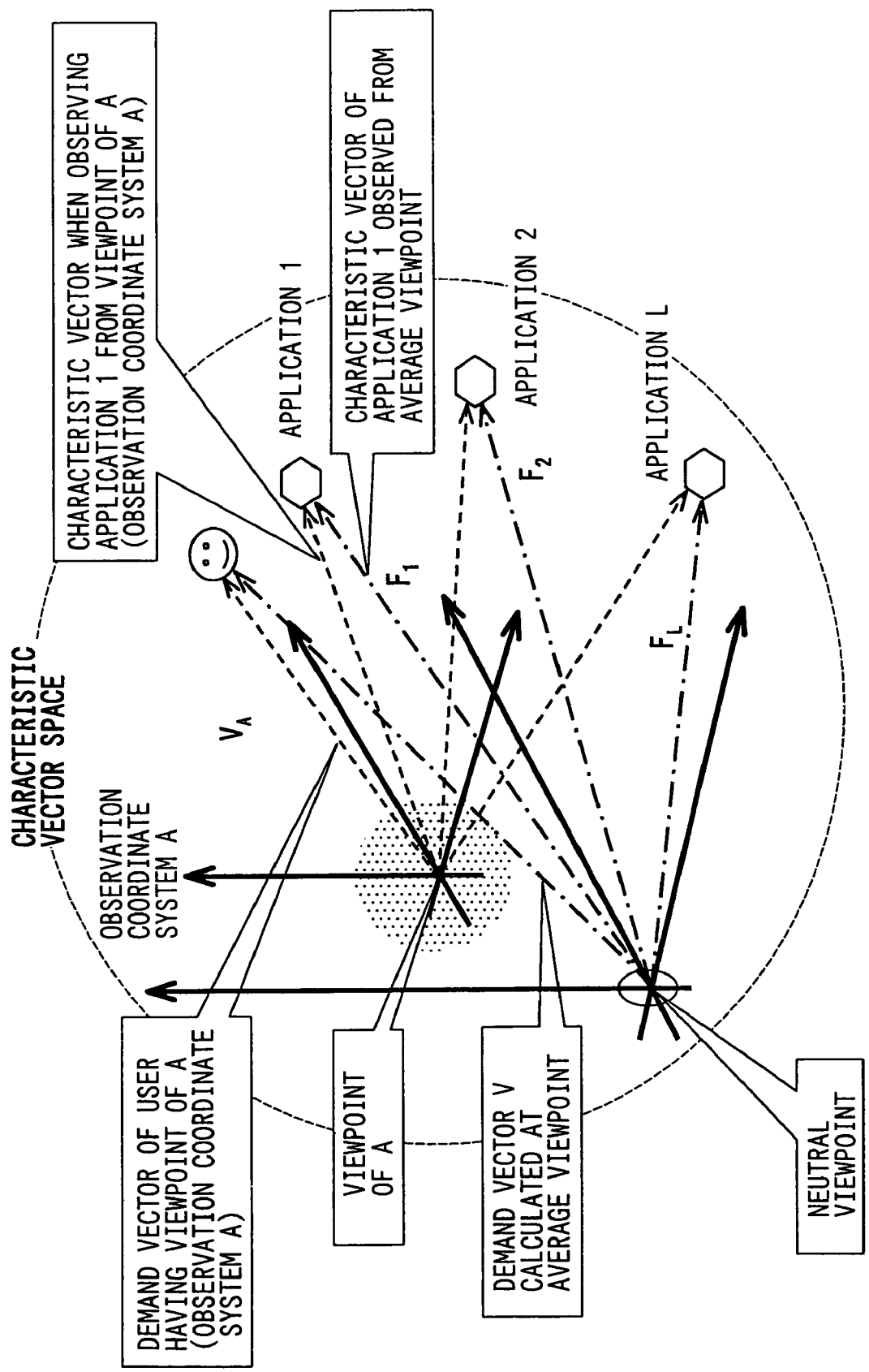
FIG. 22 is a diagram showing a modification of the viewpoint converting process.

In the foregoing embodiment, by performing the attribute converting process, the demand vector V is converted to the application vector Va. In the case where a clear relation as show by Equation (5) is not defined between the demand vector V and the application vector Va, as shown in FIG. 22, the demand vector V and the application vector Va have to be expressed in the same vector space. The space may be a demand vector space in which the coordinate axis corresponds to a desire of the user or a general characteristic space. In this case, in addition to the conversion of the viewpoint of the user, conversion of the viewpoint on an application has to be performed. Specifically, for example, in a coordinate system corresponding to the viewpoint of the user A, similarity calculation is performed between characteristic vectors $F1$ to FL of applications and the demand vector VA of the viewpoint of the user A, and the applications are arranged in descending order of similarity.

It will be obvious to those skilled in the art that various changes may be made in the above-described embodiments of the present invention. However, the scope of the present invention should be determined by the following claims.

What is claimed is:

1. A computer-readable medium encoded with an inferring system for a vehicle or an occupant of the vehicle making an inference for a situation by using a rule expressed in an If-Then form including a conditional clause and a dependent clause, the inferring system comprising:

means for storing a rule group the rule group comprised of a plurality of rules;

the rules individually comprised of the conditional clause and the dependant clause;

the conditional clause having a linguistic or numerical condition relating to one or more of a plurality of preset situation attributes;

the preset situation attributes relative to the conditional clause in the rules including attributes of situations, each situation being associated with at least one of the vehicle and the occupant of the vehicle, the dependant clause having a scoring vector;

the scoring vector comprised of a plurality of dimensions being a plurality of preset demand attributes, each dimension having a component represented by a numerical value being a degree of a demand for each of the plurality of preset demand attributes;

the demand attributes relative to the dependent clause in the rules including attributes of demands, each demand being associated with the occupant of the vehicle;

means for obtaining situation data for recognizing the situation, determining whether a conditional clause of the rule is sufficient or not based on the obtained situation data, and extracting a scoring vector as a component represented as a numerical value of the dependant clause of each of the rules determined to have sufficient conditional clauses;

means for generating a demand vector;

the demand vector having dimensions being the demand attributes in a state generally recognized from the situation data by performing a process of cumulating the scoring vectors extracted by the obtaining means, each dimension having a component represented by a numerical value being a degree of a demand for each demand attribute; and means for generating an inference result based on the demand vector generated by the generating means, wherein the inference result is derived by choosing the demand attributes having the highest degree of demand; and means for displaying the inference result as a selection key on an interactive display unit.

2. The computer-readable medium encoded with the inferring system according to claim 1,
wherein a rule group stored in the storing means includes a one-dimensional rule in which a linguistic or numerical condition for a single situation attribute is described in the conditional clause.

3. The computer-readable medium encoded with the inferring system according to claim 1,
wherein a rule group stored in the storing means includes a hierarchical rule in which a linguistic or numerical condition for more than one of the situational attributes is described in the conditional clause.

4. The computer-readable medium encoded with the inferring system according to claim 1,
wherein a plurality of rule groups are stored in the storing means, and
the obtaining means selects a rule group to be used in accordance with the situation data.

5. The computer-readable medium encoded with the inferring system according to claim 1,
wherein the means for generating the demand vector performs weighted addition on the scoring vectors as the process of cumulating the scoring vectors.

6. The computer-readable medium encoded with the inferring system according to claim 1,
wherein an application is associated with the demand attribute.

7. The computer-readable medium encoded with the inferring system according to claim 1,
wherein an estimated desire of a user is associated with the demand attribute.

8. The computer-readable medium encoded with the inferring system according to claim 7,
wherein the generating means includes attribute converting means for converting a demand vector having, as the demand attribute, the desire of the user obtained by the cumulating process into a demand vector having an application as the demand attribute.

9. The computer-readable medium encoded with the inferring system according to claim 1,
wherein the scoring vector is set based on a viewpoint of an average user,
wherein the situation data includes at least viewpoint data indicative of a viewpoint of each user, and
wherein the generating means includes means for converting a demand vector obtained by the cumulating process into a demand vector in which the viewpoint of the user is reflected based on the viewpoint data.

10. The computer-readable medium encoded with the inferring system according to claim 9,
wherein the converting means converts the demand vector by using a coordinate conversion matrix and a translation vector.

11. The inferring system according to claim 1,
wherein initial data of the scoring vector is obtained by totaling evaluations of attribute values based on subjective determinations by a first number of users and statistically averaging the evaluations.

12. The computer-readable medium encoded with the inferring system according to claim 11,
wherein initial data of the scoring vector is obtained by converting subjective empirical rules made by a second number of users into numerical data, the second number of users being greater than the first number of users.

13. The computer-readable medium encoded with the inferring system according to claim 1, further comprising
means for setting initial data of the scoring vector.

14. The computer-readable medium encoded with the inferring system according to claim 13,
wherein the setting means sets, as the initial data, input data from an outside or a template selected by an external operation from a preset template group.

15. The computer-readable medium encoded with the inferring system according to claim 13,
wherein the setting means includes means for generating initial data of the scoring vector by inference based on a user profile in which at least a preference of the user is described.

16. The computer-readable medium encoded with the inferring system according to claim 13,
wherein, the rule group is classified into a plurality of partial rule groups constructed by rules in each of which a condition of a same situation attribute is described in the conditional clause and initial data of a scoring vector is set in a certain rule, the setting means includes means for transferring the same initial data to scoring vectors of other rules belonging to a same partial rule group to which the certain rule belongs.

17. The computer-readable medium encoded with the inferring system according to claim 1, further comprising
means for correcting an inference characteristic of the system based on feedback information to an inference result generated by the inference result generating means.

18. The computer-readable medium encoded with the inferring system according to claim 17,
wherein the feedback information is information related to a same user.

19. The computer-readable medium encoded with the inferring system according to claim 17,
wherein the feedback information is information related to another user.

20. The computer-readable medium encoded with the inferring system according to claim 17,
wherein when a preset correction condition is satisfied, the correcting means uses, as the feedback information, a demand vector used to generate an inference result by the generating means, and response data indicative of a response of a user to whom the inference result was presented.

21. The computer-readable medium encoded with the inferring system according to claim 20, further comprising
means for storing a history of the feedback information.

22. The computer-readable medium encoded with the inferring system according to claim 20,
wherein when a difference equal to or larger than a preset threshold value exists between an operation vector generated from the response data and a demand vector associated with the response data in accordance with the feedback information or when it is statistically recognized that a difference equal to or larger than the threshold value exists between the vectors based on history of the feedback information in a preset period, it is regarded that the correction condition is satisfied, and the correcting means corrects the inference characteristic based on a target rule as the rule related to the demand vector satisfying the correction condition.

23. The computer-readable medium encoded with the inferring system according to claim 22,
wherein the correcting means corrects the inference characteristic by changing a value of a scoring vector as a component of the dependent clause of the target rule.

24. The computer-readable medium encoded with the inferring system according to claim 22,
wherein the correcting means corrects the inference characteristic by changing a linguistic or numerical condition as a component of the conditional clause of the target value.

25. The computer-readable medium encoded with the inferring system according to claim 22,
wherein the correcting means corrects the inference characteristic by adding a new rule obtained by sub-dividing the linguistic or numerical condition as a component of the conditional clause of the target rule.

26. The computer-readable medium encoded with the inferring system according to claim 22,
wherein the correcting means corrects the inference characteristic by setting a new situation attribute based on the target rule and adding a rule corresponding to the situation attribute.

27. The computer-readable medium encoded with the inferring system according to claim 22,
wherein at the time of generating the demand vector by the generating means, the correcting means corrects the inference characteristic by changing a value of a parameter used for a scoring vector as a component of a dependent clause of the target rule.

28. The computer-readable medium encoded with the inferring system according to claim 22,
wherein the situation data obtained by the obtaining means includes a user profile in which at least a preference of a user is described, and
wherein the correcting means corrects the inference characteristic by adding or changing description of the user profile.

29. The computer-readable medium encoded with the inferring system according to claim 1, further comprising:
means for detecting a response from a user to whom an inference result generated by the generating means is presented; and
means for setting a rule related to a demand vector used to obtain the inference result as a rule to be enhanced, and enhancing the rule to be enhanced when the response detected by the detecting means is an affirmative response to the inference result.

30. The computer-readable medium encoded with the inferring system according to claim 29,
wherein when neighborhood of a conditional clause of the rule to be enhanced is able to be defined, the setting means also sets a rule having a conditional clause included in the neighborhood as an object to be enhanced.

31. The computer-readable medium encoded with the inferring system according to claim 29,
wherein the setting means enhances the rule to be enhanced by changing a parameter used at the time of generating the demand vector from a scoring vector as a component of a dependent clause of the rule to be enhanced by the generating means.

32. The computer-readable medium encoded with the inferring system according to claim 29,
wherein the setting means enhances the rule to be enhanced by increasing a value of a scoring vector as a component of a dependent clause of the rule to be enhanced.

33. A method of visually expressing a rule group for a situation, the method comprising:
storing a rule group comprised of a plurality of rules, the rules individually comprised of a conditional clause and a dependent clause, the conditional clause having a linguistic or a numeric condition relating to one or more of a plurality of preset situation attributes, the situation attributes relative to the conditional clause in the rules including attributes of situations, each situation being associated with at least one of a vehicle and an occupant of the vehicle, the dependant clause having a scoring vector, the scoring vector comprised of a plurality of dimensions being a plurality of preset demand attributes, each dimension having a component represented by a numerical value being a degree of a demand for each of the plurality of preset demand attributes, the demand attributes relative to the dependent clause in the rules including attributes of demands, each demand being associated with the occupant of the vehicle;
obtaining situation data for recognizing the situation, determining whether a conditional clause of the rule is sufficient or not based on the obtained situation data, and extracting a scoring vector as a component represented as a numerical value of the dependant clause of each of the rules determined to have sufficient conditional clauses;
generating a demand vector, the demand vector having dimensions being the demand attributes in a state generally recognized from the situation data by performing a process of cumulating the extracted scoring vectors, each dimension having a component represented by a numerical value being a degree of a demand for the each demand attribute;
generating an inference result based on the generated demand vector, wherein the inference result is derived by choosing the demand attributes having the highest degree of demand;
associating two of the situation attributes with a two-dimensional address for specifying each of tile images two-dimensionally arranged;
associating three of the demand attributes with three primary colors expressing colors of the tile images;
visually expressing each of the tile images in its expressed color on a display device; and
providing an opportunity for a user to edit the rules, the scoring vector, the components of the scoring vector, or situation attributes using the display device.

* * * * *